United States Patent
Zhang et al.

(10) Patent No.: US 9,923,930 B2
(45) Date of Patent: Mar. 20, 2018

(54) SELECTIVELY ENABLING AND DISABLING BIOMETRIC AUTHENTICATION BASED ON MOBILE DEVICE STATE INFORMATION

(71) Applicant: Bank of America Corporation, Charlotte, NC (US)

(72) Inventors: Xianhong Zhang, Issaquah, WA (US); Wenhui Meng, Bothell, WA (US); Kalyan V. Pasumarthi, Bothell, WA (US); Elizabeth S. Votaw, Potomac, MD (US); Andrew T. Keys, Albany, OR (US); Apeksh M. Dave, Weddington, NC (US)

(73) Assignee: Bank of America Corporation, Charlotte, NC (US)

( * ) Notice: Subject to any disclaimer, the term of this patent is extended or adjusted under 35 U.S.C. 154(b) by 126 days.

(21) Appl. No.: 14/945,681

(22) Filed: Nov. 19, 2015

(65) Prior Publication Data

US 2017/0149840 A1 May 25, 2017

(51) Int. Cl.
*G06F 7/04* (2006.01)
*G06F 15/16* (2006.01)
(Continued)

(52) U.S. Cl.
CPC ......... *H04L 63/205* (2013.01); *G06Q 20/108* (2013.01); *G06Q 20/40145* (2013.01); *H04L 63/0861* (2013.01)

(58) Field of Classification Search
CPC .................................................. G06Q 20/108
(Continued)

(56) References Cited

U.S. PATENT DOCUMENTS

| 7,766,223 B1 * | 8/2010 | Mello | G06Q 20/32 235/379 |
| 2008/0293397 A1 * | 11/2008 | Gajdos | H04L 63/08 455/420 |

(Continued)

OTHER PUBLICATIONS

"iOS jailbreaking," Wikipedia, the free encyclopedia, downloaded Oct. 26, 2015 from https://en.wikipedia.org/wiki/IOS_jailbreaking, 16 pages.

(Continued)

*Primary Examiner* — Taghi Arani
*Assistant Examiner* — Khalil Naghdali
(74) *Attorney, Agent, or Firm* — Banner & Witcoff, Ltd.; Michael A. Springs

(57) ABSTRACT

Methods, systems, and computer-readable media for selectively enabling and disabling biometric authentication are presented. In some embodiments, a computing platform may receive, from a device monitoring and management computer system, a device state indicator message comprising device state information associated with a mobile computing device. Subsequently, the computing platform may set a biometric authentication flag for the mobile computing device based on the device state indicator message received from the device monitoring and management computer system. Then, the computing platform may generate an authentication functionality message for the mobile computing device based on the biometric authentication flag set for the mobile computing device, and the authentication functionality message may be configured to selectively enable or disable one or more biometric authentication functions provided by the mobile computing device. Thereafter, the computing platform may send, to the mobile computing device, the authentication functionality message generated for the mobile computing device.

15 Claims, 19 Drawing Sheets

(51) Int. Cl.
  *G06F 17/30* (2006.01)
  *H04L 29/06* (2006.01)
  *G06Q 20/40* (2012.01)
  *G06Q 20/10* (2012.01)
(58) Field of Classification Search
  USPC .......................................................... 726/6
  See application file for complete search history.

(56) References Cited

U.S. PATENT DOCUMENTS

| | | | |
|---|---|---|---|
| 2013/0312058 A1* | 11/2013 | Thompson | G06F 21/54 726/1 |
| 2014/0109200 A1* | 4/2014 | Tootill | G06F 21/32 726/5 |
| 2015/0094023 A1* | 4/2015 | Abramson | H04W 12/06 455/411 |
| 2015/0163121 A1* | 6/2015 | Mahaffey | G06F 11/0766 707/687 |
| 2015/0163940 A1 | 6/2015 | Scott et al. | |
| 2015/0168174 A1 | 6/2015 | Abramson et al. | |
| 2015/0168175 A1 | 6/2015 | Abramson et al. | |
| 2015/0169892 A1 | 6/2015 | Nord et al. | |
| 2015/0172435 A1 | 6/2015 | Choi et al. | |
| 2015/0172743 A1 | 6/2015 | Itagaki | |
| 2015/0177010 A1 | 6/2015 | Abramson et al. | |
| 2015/0178499 A2 | 6/2015 | Niemela et al. | |
| 2015/0178724 A1 | 6/2015 | Ngo et al. | |
| 2015/0180836 A1 | 6/2015 | Wong et al. | |
| 2015/0185968 A1 | 7/2015 | Kim et al. | |
| 2015/0186094 A1 | 7/2015 | Ricci | |
| 2015/0186638 A1 | 7/2015 | Wang et al. | |
| 2015/0188961 A1 | 7/2015 | Ricci | |
| 2015/0215443 A1 | 7/2015 | Heo et al. | |
| 2015/0222517 A1 | 8/2015 | McLaughlin et al. | |
| 2015/0223145 A1 | 8/2015 | Yoon et al. | |
| 2015/0227903 A1 | 8/2015 | Votaw et al. | |
| 2015/0227927 A1 | 8/2015 | Votaw et al. | |
| 2015/0232065 A1 | 8/2015 | Ricci et al. | |
| 2015/0241231 A1 | 8/2015 | Abramson et al. | |
| 2015/0242608 A1 | 8/2015 | Kim et al. | |
| 2015/0244121 A1 | 8/2015 | Amelio et al. | |
| 2015/0244719 A1 | 8/2015 | Sampathkumaran et al. | |
| 2015/0244850 A1 | 8/2015 | Rodriguez et al. | |
| 2015/0245167 A1 | 8/2015 | Bobrow et al. | |
| 2015/0259110 A1 | 9/2015 | Blackburn | |
| 2015/0264474 A1 | 9/2015 | Seo et al. | |
| 2015/0269375 A1 | 9/2015 | Chapman | |
| 2015/0269497 A1 | 9/2015 | Barnett et al. | |
| 2015/0269568 A1 | 9/2015 | Barnett et al. | |
| 2015/0270961 A1 | 9/2015 | Barnett et al. | |
| 2015/0271150 A1 | 9/2015 | Barnett et al. | |
| 2015/0277123 A1 | 10/2015 | Chaum et al. | |
| 2015/0281430 A1 | 10/2015 | Cho et al. | |
| 2015/0293592 A1 | 10/2015 | Cheong et al. | |
| 2015/0296460 A1 | 10/2015 | Lee et al. | |
| 2015/0297776 A1 | 10/2015 | Conroy et al. | |
| 2015/0297777 A1 | 10/2015 | Conroy et al. | |
| 2015/0297778 A1 | 10/2015 | Conroy et al. | |
| 2015/0297779 A1 | 10/2015 | Conroy et al. | |
| 2015/0302854 A1 | 10/2015 | Clough | |
| 2015/0304569 A1 | 10/2015 | Choi | |
| 2015/0309809 A1 | 10/2015 | Shin et al. | |
| 2015/0310736 A1 | 10/2015 | Yamada et al. | |
| 2015/0312041 A1 | 10/2015 | Choi | |
| 2015/0317437 A1 | 11/2015 | Daoud et al. | |
| 2015/0319226 A1 | 11/2015 | Mahmood | |
| 2015/0326554 A1 | 11/2015 | Chen et al. | |
| 2015/0326626 A1 | 11/2015 | Diab et al. | |
| 2016/0098697 A1* | 4/2016 | Dunsmore | G06Q 20/32 705/39 |

OTHER PUBLICATIONS

"Rooting (Android OS)," Wikipedia, the free encyclopedia, downloaded Oct. 26, 2015 from https://en.wikipedia,org/wiki/Routing_(Android_OS), 8 pages.

* cited by examiner

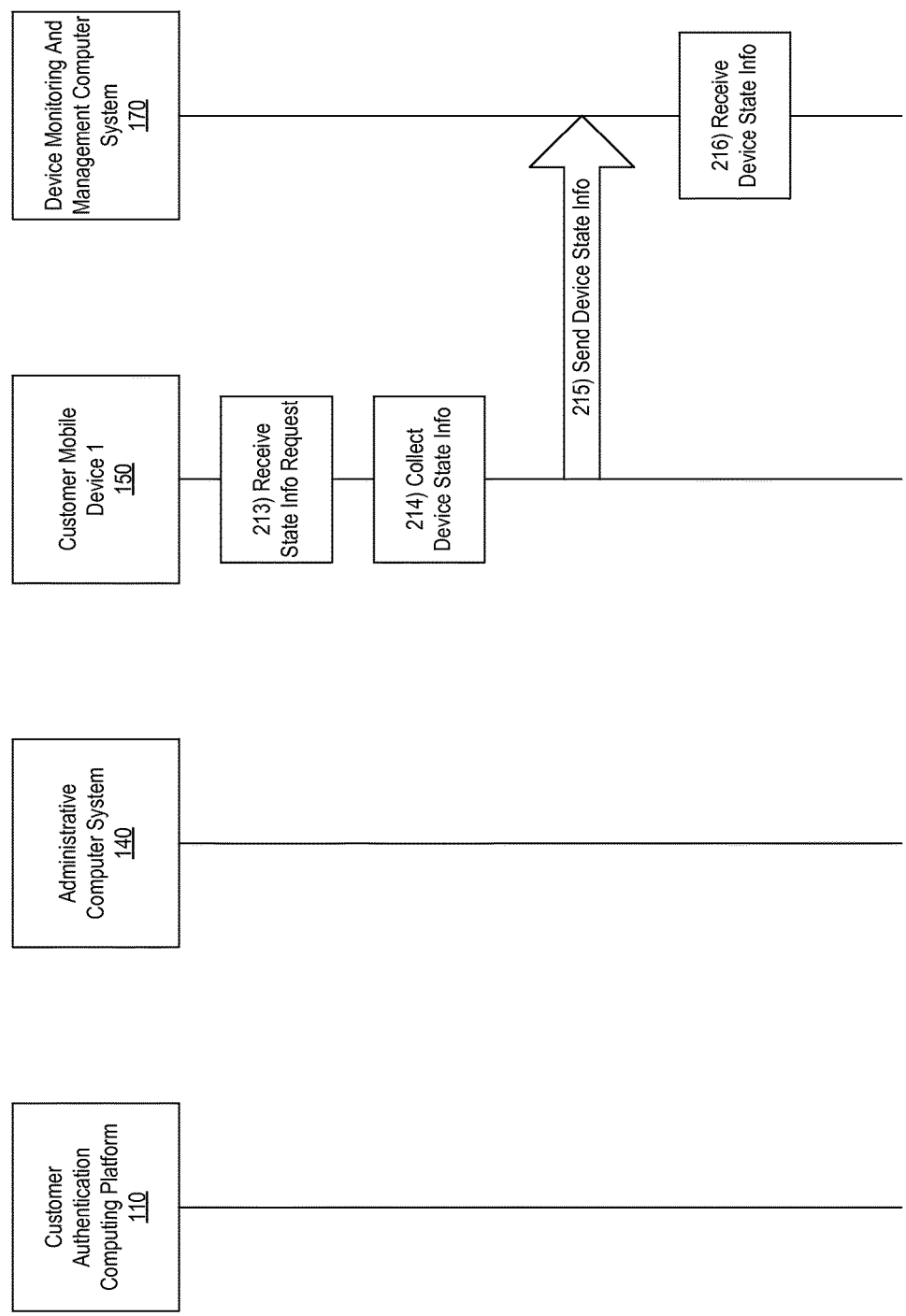

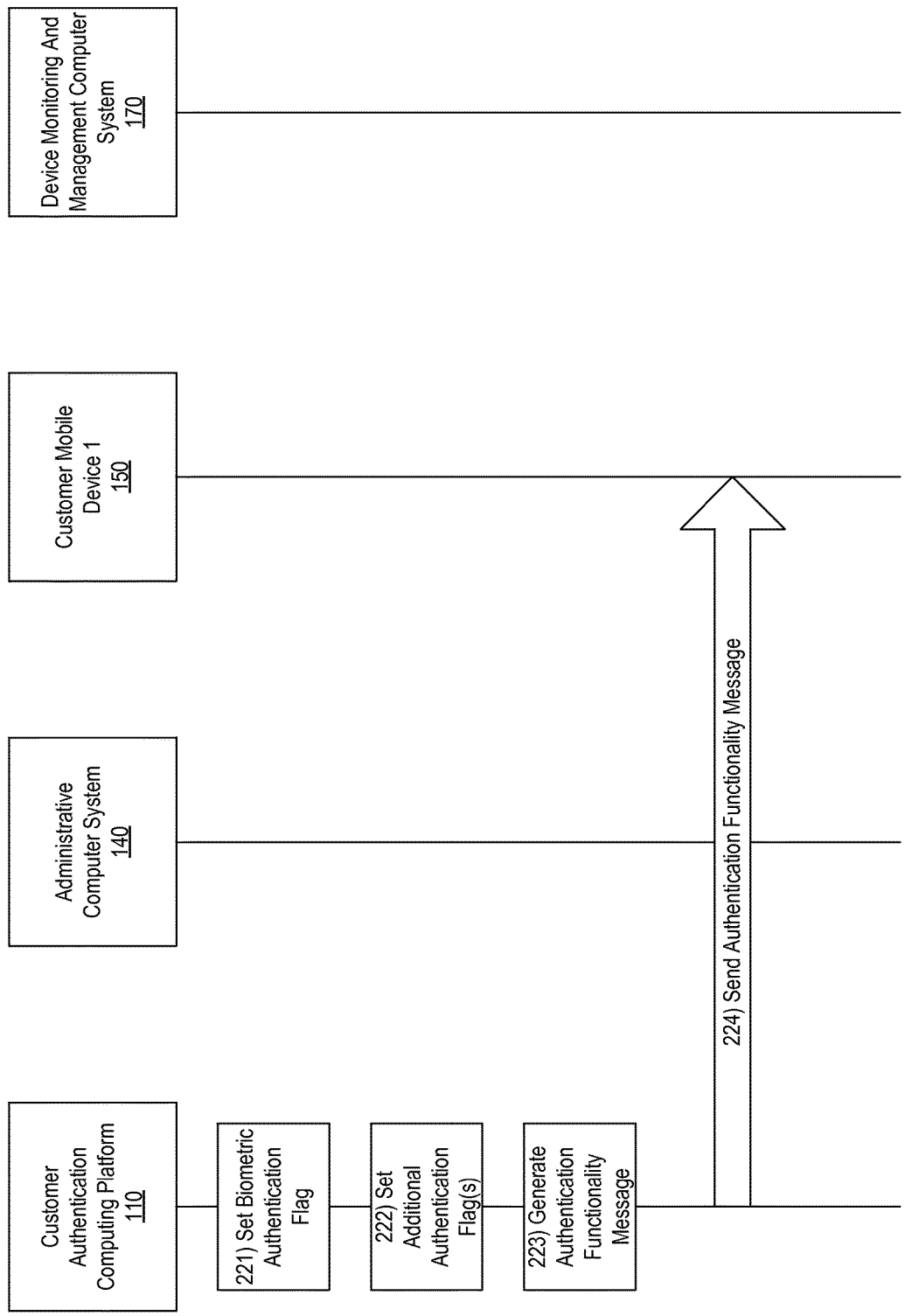

SELECTIVELY ENABLING AND DISABLING BIOMETRIC AUTHENTICATION BASED ON MOBILE DEVICE STATE INFORMATION

BACKGROUND

Aspects of the disclosure relate to computer hardware and software. In particular, one or more aspects of the disclosure generally relate to computer hardware and software for selectively enabling and disabling biometric authentication.

Mobile computing devices are becoming increasingly popular, and many organizations are developing and providing their clients, employees, and others with mobile applications or "apps." These mobile applications may, for instance, allow clients, employees, and others to interact with the organization in various ways, depending on the functionality built into the particular application.

As organizations engage with clients using applications and other new technology, it may be increasingly important for such organizations to maintain and ensure the safety and security of client information. In some instances, however, the mobile devices on which such applications run can create information security issues and other issues for an organization and its clients, and it may be difficult to provide technical solutions that address and overcome the technical problems that create and underlie these information security issues and other issues.

SUMMARY

Aspects of the disclosure provide effective, efficient, scalable, and convenient technical solutions that address and overcome the technical problems associated with maintaining and ensuring the safety and security of client information when providing various users, such as clients of an organization, with one or more mobile applications.

For example, some aspects of the disclosure provide ways of selectively enabling and disabling biometric authentication based on mobile device state information. Such mobile device state information may, for instance, include information indicative of the current configuration and/or operating state of a mobile computing device.

For instance, an organization may provide a client with a mobile application that allows the client to access information maintained by the organization for the client, such as a mobile application that allows the client to access client account information maintained by the organization for the client. To ensure the security of such information, the organization may design the application so that the client has to login by providing one or more authentication credentials for validation, including one or more biometric authentication credentials, such as one or more fingerprints, voiceprints, and/or the like.

In some instances, by providing such biometric authentication credentials for validation, the client might not need to enter or provide other authentication credentials that might otherwise be required when logging in, such as a username, a password, a one-time passcode, and/or the like. In certain instances, however, this arrangement may present information security issues for the organization and for the client, such as in instances in which the mobile computing device (e.g., on which the mobile application is executed) has been jailbroken or rooted. In these instances, biometric authentication might not be reliable or trusted, due to the technical problems associated with the device being jailbroken or rooted.

By implementing one or more aspects of the disclosure, the organization providing the mobile application may be able to dynamically and selectively disable biometric authentication in these and/or other instances, so as to reduce the issues to the organization and/or to the client using the mobile application. Additionally or alternatively, the organization may be able to require the client to provide additional authentication credentials for validation, such as a one-time passcode and/or a response to one or more security questions, in instances in which the device risk profile or device risk level exceeds a predetermined acceptable device risk profile or threshold device risk level.

In accordance with one or more embodiments, a customer authentication computing platform having at least one processor, a memory, and a communication interface may receive, via the communication interface, and from a device monitoring and management computer system, a device state indicator message comprising device state information associated with a mobile computing device. Subsequently, the customer authentication computing platform may set a biometric authentication flag for the mobile computing device based on the device state indicator message received from the device monitoring and management computer system. Then, the customer authentication computing platform may generate an authentication functionality message for the mobile computing device based on the biometric authentication flag set for the mobile computing device, and the authentication functionality message may be configured to selectively enable or disable one or more biometric authentication functions provided by the mobile computing device. Thereafter, the customer authentication computing platform may send, via the communication interface, and to the mobile computing device, the authentication functionality message generated for the mobile computing device.

In some embodiments, the authentication functionality message may be configured to selectively disable a biometric authentication function of a mobile banking application executed on the mobile computing device. In some instances, the mobile banking application may be provided by a financial institution, and the mobile computing device may be used by a customer of the financial institution.

In some instances, the device state information associated with the mobile computing device may include an indication of whether the mobile computing device has been jailbroken. In some instances, the device state information associated with the mobile computing device may include an indication of whether the mobile computing device has been rooted.

In some instances, the device state information associated with the mobile computing device may include location information identifying a current geographic location of the mobile computing device. In some instances, the device state information associated with the mobile computing device may include application information identifying one or more programs that are installed or running on the mobile computing device. In some instances, the device state information associated with the mobile computing device may include user information identifying a current user of the mobile computing device.

In some instances, prior to receiving the device state indicator message comprising the device state information associated with the mobile computing device, the customer authentication computing platform may receive, via the communication interface, and from the mobile computing device, a connect message comprising one or more identifiers associated with the mobile computing device. Based on receiving the connect message comprising the one or more identifiers associated with the mobile computing device, the customer authentication computing platform may generate a probe request for the mobile computing device, and the probe request may be configured to cause the device monitoring and management computer system to collect state information from the mobile computing device. Subsequently, the customer authentication computing platform may send, via the communication interface, and to the device monitoring and management computer system, the probe request generated for the mobile computing device.

In some instances, the device state information associated with the mobile computing device may be collected by a management agent executed on the mobile computing device. In some instances, the device state information associated with the mobile computing device may be collected by the mobile banking application executed on the mobile computing device.

In some instances, the customer authentication computing platform may set one or more additional authentication flags for the mobile computing device based on the device state indicator message received from the device monitoring and management computer system.

In some instances, after sending the authentication functionality message generated for the mobile computing device to the mobile computing device, the customer authentication computing platform may receive, via the communication interface, and from the mobile computing device, authentication input information. Subsequently, the customer authentication computing platform may validate the authentication input information received from the mobile computing device. Based on validating the authentication input information received from the mobile computing device, the customer authentication computing platform may provide, to the mobile computing device, online banking information associated with one or more financial accounts maintained by the financial institution for the customer of the financial institution.

In some instances, prior to providing the online banking information to the mobile computing device, the customer authentication computing platform may generate one or more additional authentication prompts based on the one or more additional authentication flags set for the mobile computing device. Subsequently, the customer authentication computing platform may provide the one or more additional authentication prompts to the mobile computing device.

In some instances, the biometric authentication function of the mobile banking application executed on the mobile computing device may include a fingerprint biometric authentication function. In some instances, the biometric authentication function of the mobile banking application executed on the mobile computing device may include a voice biometric authentication function. In some instances, the biometric authentication function of the mobile banking application executed on the mobile computing device may include a facial biometric authentication function. In some instances, the biometric authentication function of the mobile banking application executed on the mobile computing device may include a retinal biometric authentication function.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2I depict an illustrative event sequence for selectively enabling and disabling biometric authentication in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
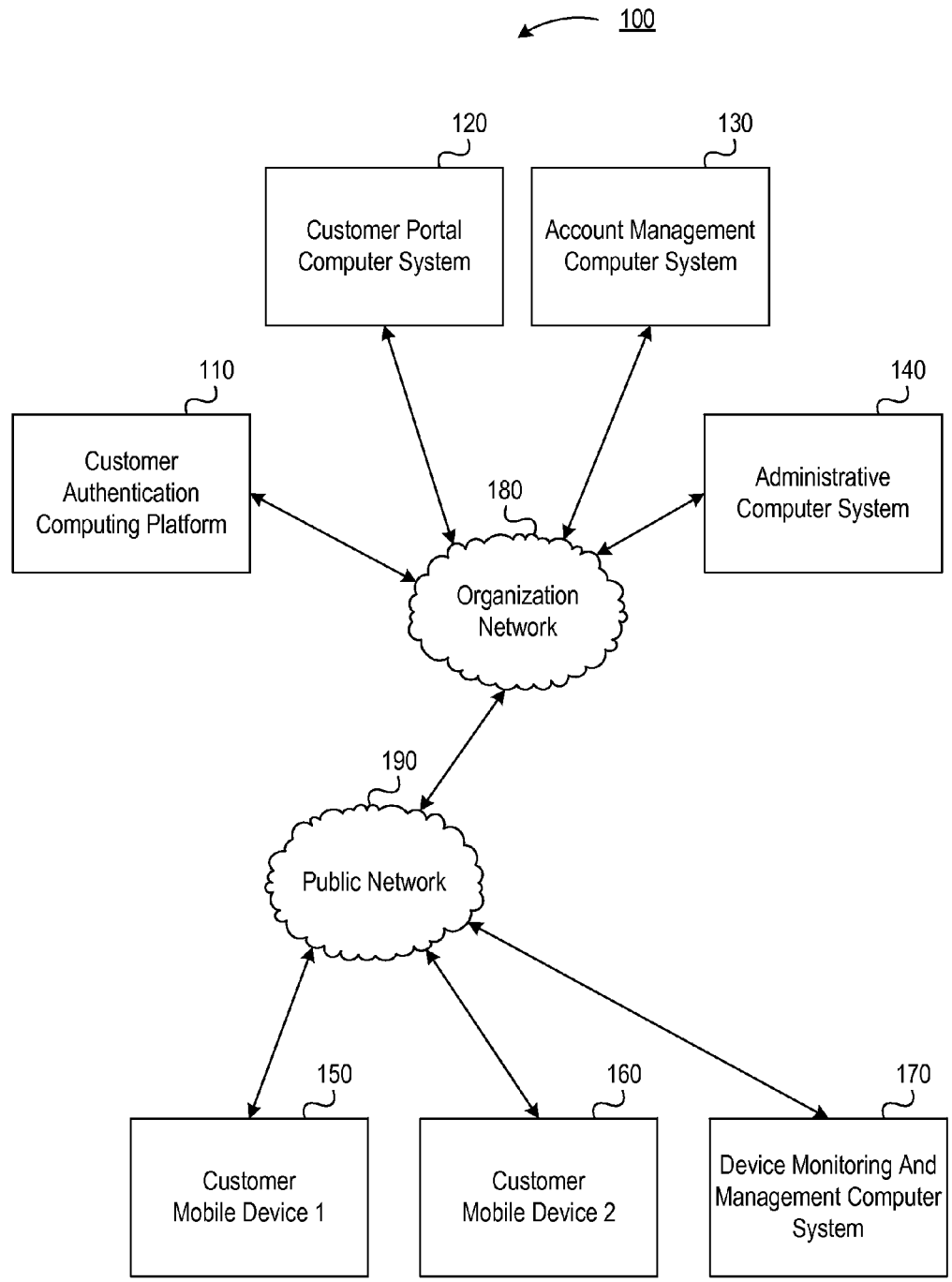
FIGS. 1A-1H depict an illustrative computing environment for selectively enabling and disabling biometric authentication in accordance with one or more example embodiments.

FIGS. 1A-1H depict an illustrative computing environment for selectively enabling and disabling biometric authentication in accordance with one or more example embodiments. Referring to FIG. 1A, computing environment 100 may include one or more computing devices. For example, computing environment 100 may include a customer portal computer system 120, an account management computer system 130, an administrative computer system 140, a first customer mobile device 150, a second customer mobile device 160, and a device monitoring and management computer system 170.

Customer portal computer system 120 may be configured to provide a customer portal or other customer website to one or more computing devices used by one or more customers of an organization. For instance, customer portal computer system 120 may be configured to provide an online banking portal or other online banking website to one or more computing devices used by one or more customers of a financial institution. Account management computer system 130 may be configured to store and/or maintain account information for one or more customers of an organization. For instance, account management computer system 130 may be configured to store and/or maintain account information for one or more customers of a financial institution. Administrative computer system 140 may be configured to provide one or more interfaces that allow for configuration and management of one or more other computing devices and/or computer systems included in computing environment 100.

Customer mobile device 150 may be configured to be used by a customer of an organization, such as a customer of a financial institution. Customer mobile device 160 also may be configured to be used by a customer of an organization, such as a customer of a financial institution (who may, e.g., be different from the customer using customer mobile device 150). Device monitoring and management computer system 170 may be configured to monitor and/or manage one or more computing devices in computing environment 100. For example, device monitoring and management computer system 170 may be configured to monitor and/or manage customer mobile device 150 and/or customer mobile device 160 (e.g., to obtain device state information from customer mobile device 150 and/or customer mobile device 160), as illustrated in greater detail below.

In one or more arrangements, customer portal computer system 120, account management computer system 130, administrative computer system 140, customer mobile device 150, customer mobile device 160, and device monitoring and management computer system 170 may be any type of computing device capable of receiving a user interface, receiving input via the user interface, and communicating the received input to one or more other computing devices. For example, customer portal computer system 120, account management computer system 130, administrative computer system 140, customer mobile device 150, customer mobile device 160, and device monitoring and management computer system 170 may, in some instances, be and/or include server computers, desktop computers, laptop computers, tablet computers, smart phones, or the like. As noted above, and as illustrated in greater detail below, any and/or all of customer portal computer system 120, account management computer system 130, administrative computer system 140, customer mobile device 150, customer mobile device 160, and device monitoring and management computer system 170 may, in some instances, be special-purpose computing devices configured to perform specific functions.

Computing environment 100 also may include one or more computing platforms. For example, computing environment 100 may include customer authentication computing platform 110. As illustrated in greater detail below, customer authentication computing platform 110 may include one or more computing devices configured to perform one or more of the functions described herein. For example, customer authentication computing platform 110 may include one or more computers (e.g., laptop computers, desktop computers, servers, server blades, or the like).

Computing environment 100 also may include one or more networks, which may interconnect one or more of customer authentication computing platform 110, customer portal computer system 120, account management computer system 130, administrative computer system 140, customer mobile device 150, customer mobile device 160, and device monitoring and management computer system 170. For example, computing environment 100 may include organization network 180 and public network 190. Organization network 180 and/or public network 190 may include one or more sub-networks (e.g., local area networks (LANs), wide area networks (WANs), or the like). Organization network 180 may be associated with a particular organization (e.g., a corporation, financial institution, educational institution, governmental institution, or the like) and may interconnect one or more computing devices associated with the organization. For example, customer authentication computing platform 110, customer portal computer system 120, account management computer system 130, and administrative computer system 140 may be associated with an organization (e.g., a financial institution), and organization network 180 may be associated with and/or operated by the organization, and may include one or more networks (e.g., LANs, WANs, virtual private networks (VPNs), or the like) that interconnect customer authentication computing platform 110, customer portal computer system 120, account management computer system 130, and administrative computer system 140 and one or more other computing devices and/or computer systems that are used by, operated by, and/or otherwise associated with the organization. Public network 190 may connect organization network 180 and/or one or more computing devices connected thereto (e.g., customer authentication computing platform 110, customer portal computer system 120, account management computer system 130, and administrative computer system 140) with one or more networks and/or computing devices that are not associated with the organization. For example, customer mobile device 150, customer mobile device 160, and device monitoring and management computer system 170 might not be associated with an organization that operates organization network 180 (e.g., because customer mobile device 150, customer mobile device 160, and device monitoring and management computer system 170 may be owned and/or operated by one or more entities different from the organization that operates organization network 180, such as one or more customers of the organization, rather than being owned and/or operated by the organization itself or an employee or affiliate of the organization), and public network 190 may include one or more networks (e.g., the internet) that connect customer mobile device 150, customer mobile device 160, and device monitoring and management computer system 170 to organization network 180 and/or one or more computing devices connected thereto (e.g., customer authentication computing platform 110, customer portal computer system 120, account management computer system 130, and administrative computer system 140).

Figure 1B:
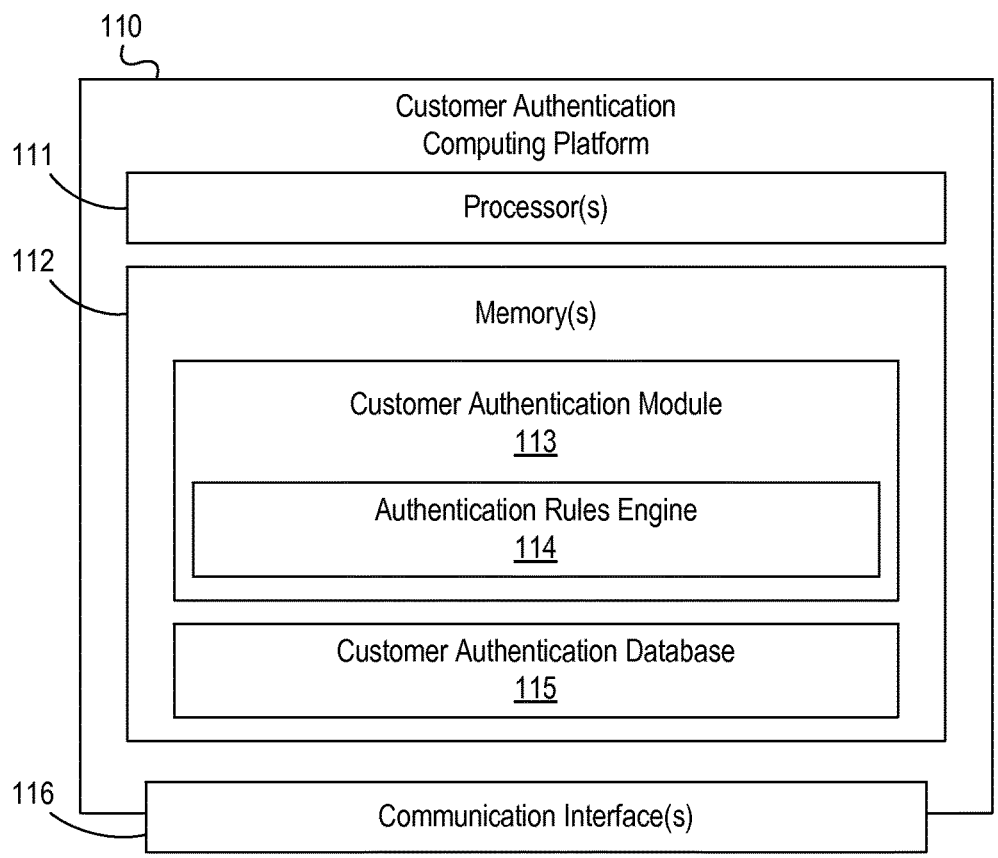

Referring to FIG. 1B, customer authentication computing platform 110 may include one or more processors 111, memory 112, and communication interface 116. A data bus may interconnect processor(s) 111, memory 112, and communication interface 116. Communication interface 116 may be a network interface configured to support communication between customer authentication computing platform 110 and one or more networks (e.g., organization network 180, public network 190, or the like). Memory 112 may include one or more program modules having instructions that when executed by processor(s) 111 cause customer authentication computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of customer authentication computing platform 110 and/or by different computing devices that may form and/or otherwise make up customer authentication computing platform 110. For example, memory 112 may include a customer authentication module 113 and a customer authentication database 115. Customer authentication module 113 may provide and/or perform one or more functions that may enable authentication of one or more customers of an organization, such as a financial institution, including one or more functions to selectively enable and/or disable biometric authentication, as illustrated in greater detail below. In addition, customer authentication module 113 may include an authentication rules engine 114, which may evaluate, process, and/or apply one or more rules in selectively enabling and disabling biometric authentication based on mobile device state information. Customer authentication database 115 may store authentication information and/or other information that may be created and/or used by customer authentication computing platform 110 in performing one or more functions.

Figure 1C:
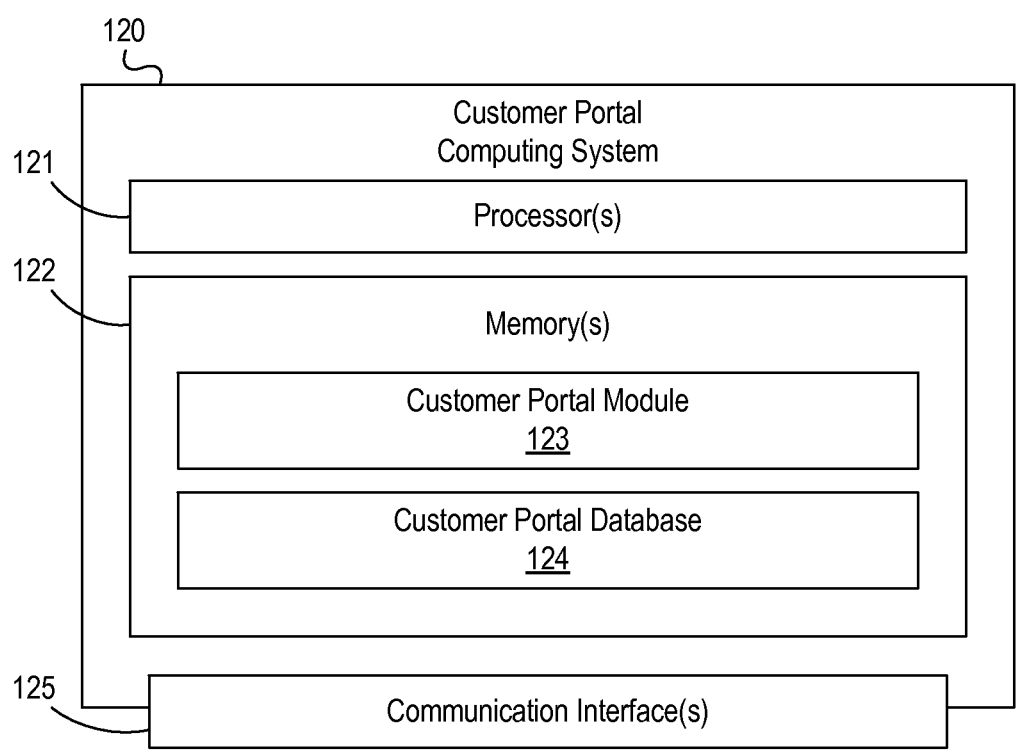

Referring to FIG. 1C, customer portal computer system 120 may include one or more processors 121, memory 122, and communication interface 125. A data bus may interconnect processor(s) 121, memory 122, and communication interface 125. Communication interface 125 may be a network interface configured to support communication between customer portal computer system 120 and one or more networks (e.g., organization network 180, public network 190, or the like). Memory 122 may include one or more program modules having instructions that when executed by processor(s) 121 cause customer portal computer system 120 to perform one or more functions described herein and/or one or more databases that may store and/or otherwise maintain information which may be used by such program modules and/or processor(s) 121. In some instances, the one or more program modules and/or databases may be stored by and/or maintained in different memory units of customer portal computer system 120 and/or by different computing devices that may form and/or otherwise make up customer portal computer system 120. For example, memory 122 may include a customer portal module 123 and a customer portal database 124. Customer portal module 123 may provide and/or perform one or more functions that may enable a customer portal, such as an online banking portal or website, to be provided to one or more customers of an organization and/or one or more computing devices used by such customers. Customer portal database 124 may store portal information and/or other information that may be created and/or used by customer portal computer system 120 in performing one or more functions.

Figure 1D:
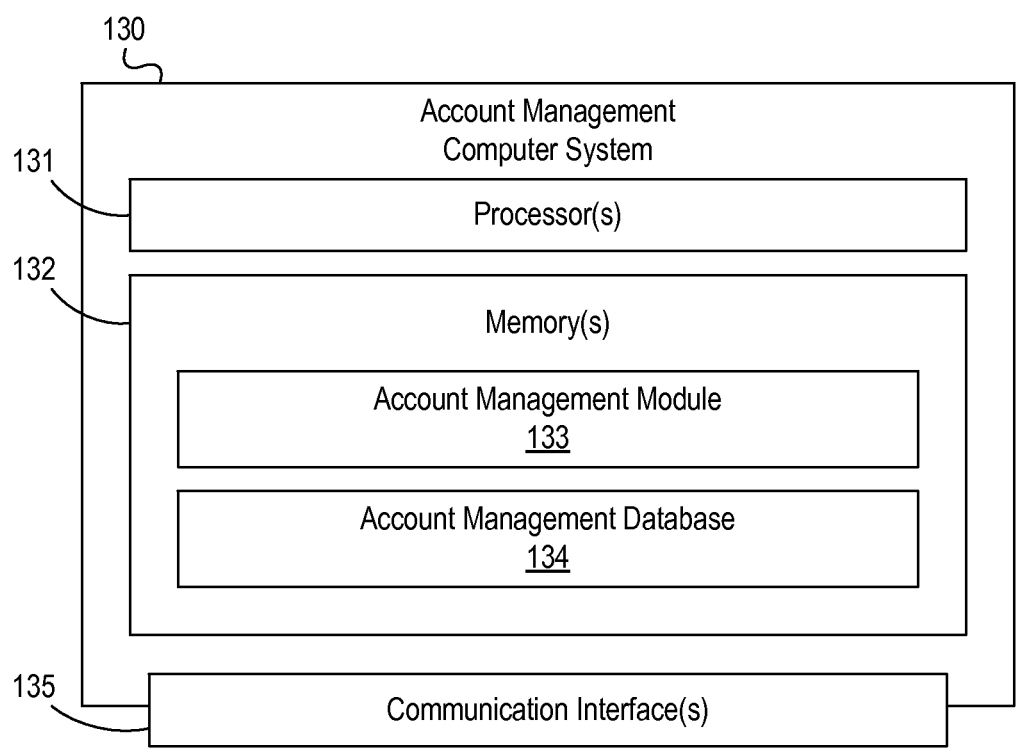

Referring to FIG. 1D, account management computer system 130 may include one or more processors 131, memory 132, and communication interface 135. A data bus may interconnect processor(s) 131, memory 132, and communication interface 135. Communication interface 135 may be a network interface configured to support communication between account management computer system 130 and one or more networks (e.g., organization network 180, public network 190, or the like). Memory 132 may include one or more program modules having instructions that when executed by processor(s) 131 cause account management computer system 130 to perform one or more functions described herein and/or one or more databases that may store and/or otherwise maintain information which may be used by such program modules and/or processor(s) 131. In some instances, the one or more program modules and/or databases may be stored by and/or maintained in different memory units of account management computer system 130 and/or by different computing devices that may form and/or otherwise make up account management computer system 130. For example, memory 132 may include an account management module 133 and an account management database 134. Account management module 133 may provide and/or perform one or more functions that may enable a customer of an organization to manage one or more aspects of an account. For instance, account management module 133 may provide and/or perform one or more functions that may enable a customer of a financial institution to manage one or more aspects of a financial account maintained by the financial institution for the customer (e.g., by allowing the customer to view account balance(s), request and/or execute bill pay transactions, transfer transactions, or the like). Account management database 134 may store account information and/or other information that may be created and/or used by account management computer system 130 in performing one or more functions.

Figure 1E:
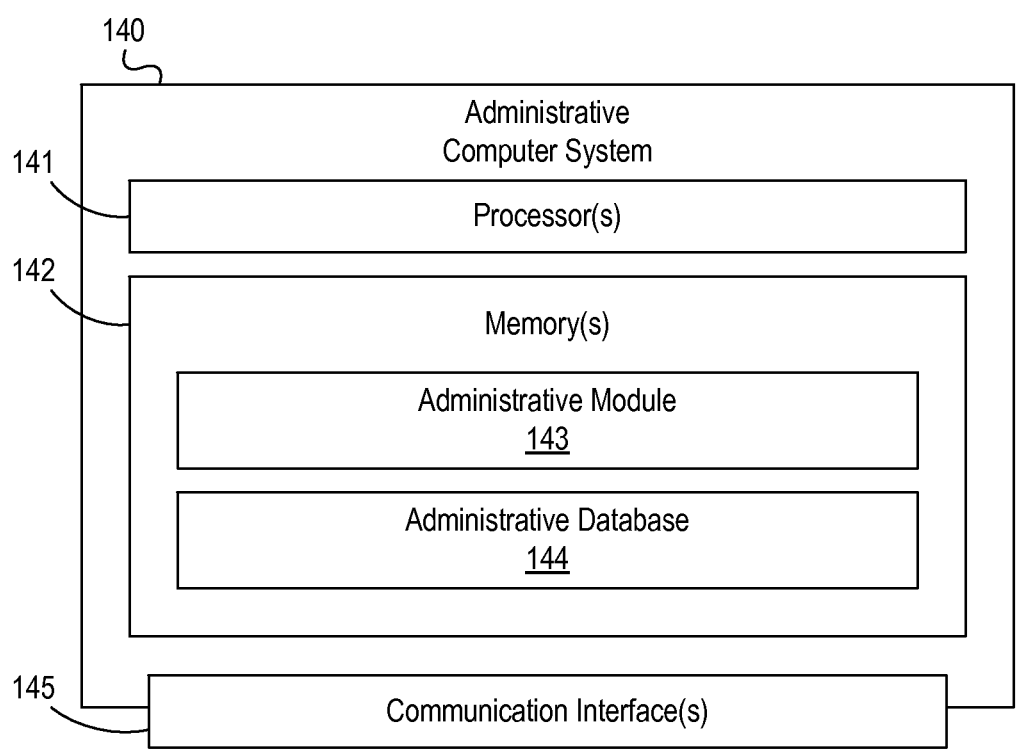

Referring to FIG. 1E, administrative computer system 140 may include one or more processors 141, memory 142, and communication interface 145. A data bus may interconnect processor(s) 141, memory 142, and communication interface 145. Communication interface 145 may be a network interface configured to support communication between administrative computer system 140 and one or more networks (e.g., organization network 180, public network 190, or the like). Memory 142 may include one or more program modules having instructions that when executed by processor(s) 141 cause administrative computer system 140 to perform one or more functions described herein and/or one or more databases that may store and/or otherwise maintain information which may be used by such program modules and/or processor(s) 141. In some instances, the one or more program modules and/or databases may be stored by and/or maintained in different memory units of administrative computer system 140 and/or by different computing devices that may form and/or otherwise make up administrative computer system 140. For example, memory 142 may include an administrative module 143 and an administrative database 144. Administrative module 143 may provide and/or perform one or more functions that may enable an administrative user to configure one or more computing devices included in computing environment 100. Administrative database 144 may store administrative information and/or other information that may be created and/or used by administrative computer system 140 in performing one or more functions.

Figure 1F:
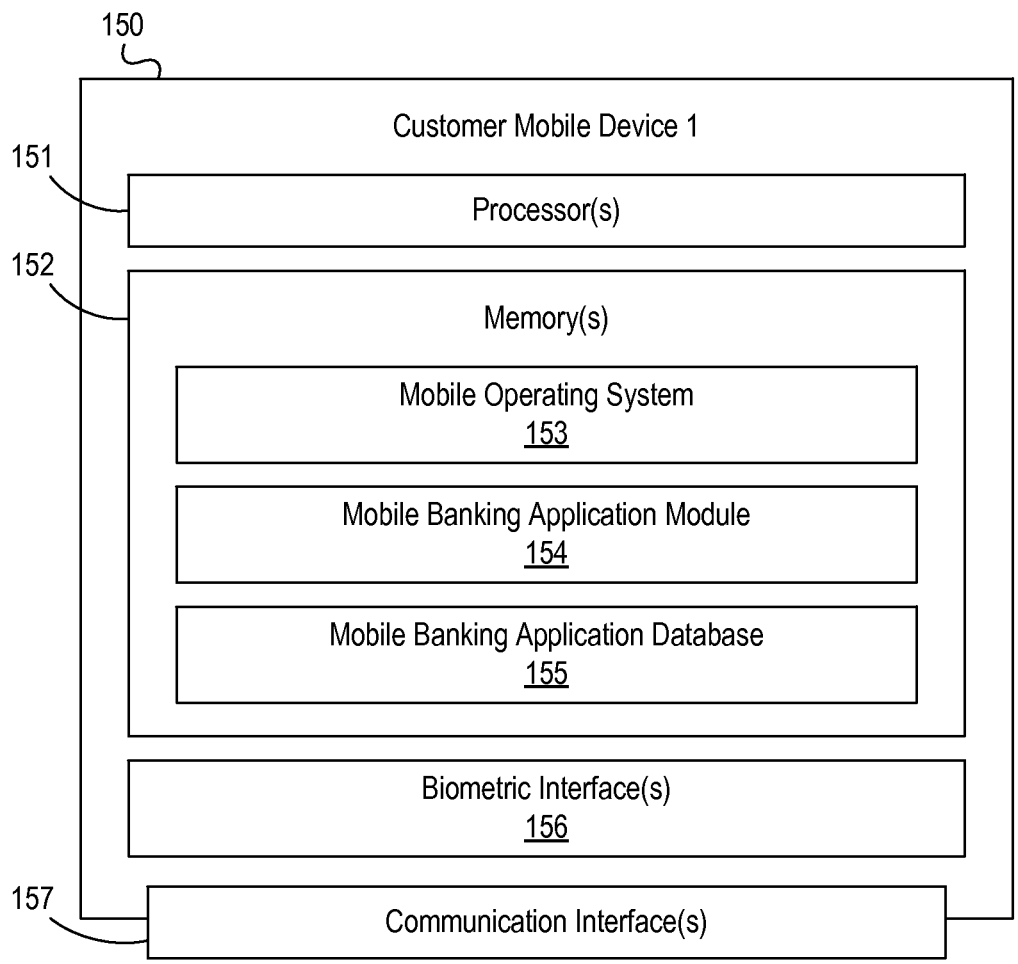

Referring to FIG. 1F, customer mobile device 150 may include one or more processors 151, memory 152, one or more biometric interfaces 156, and communication interface 157. A data bus may interconnect processor(s) 151, memory 152, biometric interface(s) 156, and communication interface 157. Communication interface 157 may be a network interface configured to support communication between customer mobile device 150 and one or more networks (e.g., organization network 180, public network 190, or the like). Biometric interface(s) 156 may include one or more input/output interfaces that may enable customer mobile device 150 to receive biometric input from a user of customer mobile device 150. For example, biometric interface(s) 156 may include one or more fingerprint readers, one or more microphones, one or more cameras, one or more retinal scanners, and/or one or more other input/output devices. Memory 152 may include one or more program modules having instructions that when executed by processor(s) 151 cause customer mobile device 150 to perform one or more functions described herein and/or one or more databases that may store and/or otherwise maintain information which may be used by such program modules and/or processor(s) 151. For example, memory 152 may include a mobile operating system 153, a mobile banking application module 154, and a mobile banking application database 155. Mobile operating system 153 may include software that provides and supports various functions of customer mobile device 150, such as providing a container in which a mobile banking application may execute, for instance. Mobile banking application module 154 may provide and/or perform one or more functions associated with a mobile banking application (which may, e.g., be used by a user of customer mobile device 150 to view and/or interact with financial account information). Mobile banking application database 155 may store mobile banking information and/or other information that may be created and/or used by customer mobile device 150 in performing one or more functions.

Figure 1G:
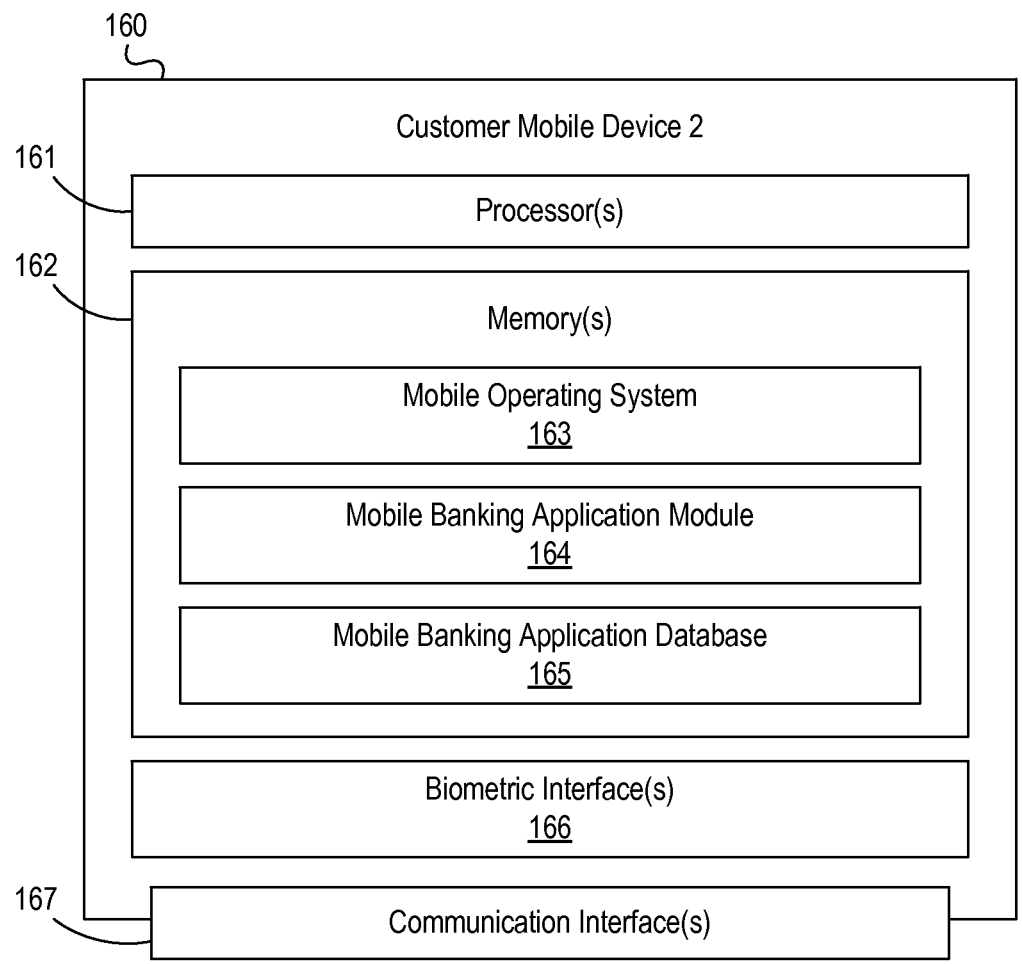
Figure 1H:
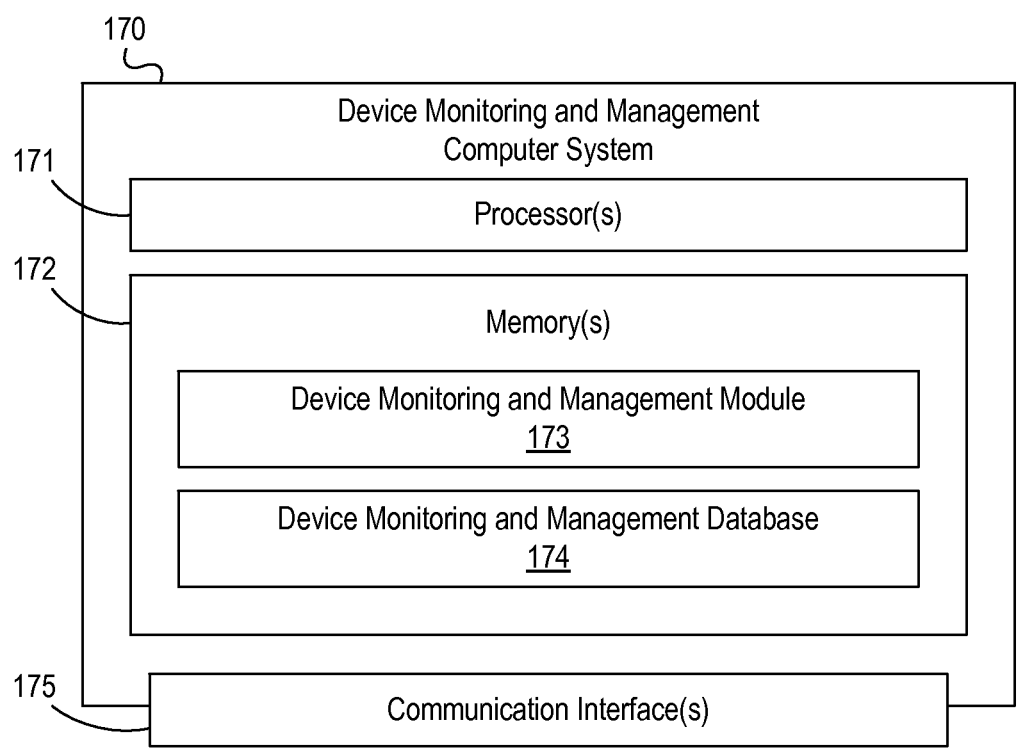

Referring to FIG. 1G, customer mobile device 160 may include one or more processors 161, memory 162, one or more biometric interfaces 166, and communication interface 167. A data bus may interconnect processor(s) 161, memory 162, biometric interface(s) 166, and communication interface 167. Communication interface 167 may be a network interface configured to support communication between customer mobile device 160 and one or more networks (e.g., organization network 180, public network 190, or the like). Biometric interface(s) 166 may include one or more input/output interfaces that may enable customer mobile device 160 to receive biometric input from a user of customer mobile device 160. For example, biometric interface(s) 166 may include one or more fingerprint readers, one or more microphones, one or more cameras, one or more retinal scanners, and/or one or more other input/output devices. Memory 162 may include one or more program modules having instructions that when executed by processor(s) 161 cause customer mobile device 160 to perform one or more functions described herein and/or one or more databases that may store and/or otherwise maintain information which may be used by such program modules and/or processor(s) 161. For example, memory 162 may include a mobile operating system 163, a mobile banking application module 164, and a mobile banking application database 165. Mobile operating system 163 may include software that provides and supports various functions of customer mobile device 160, such as providing a container in which a mobile banking application may execute, for instance. Mobile banking application module 164 may provide and/or perform one or more functions associated with a mobile banking application (which may, e.g., be used by a user of customer mobile device 160 to view and/or interact with financial account information). Mobile banking application database 165 may store mobile banking information and/or other information that may be created and/or used by customer mobile device 160 in performing one or more functions Referring to FIG. 1H, device monitoring and management computer system 170 may include one or more processors 171, memory 172, and communication interface 175. A data bus may interconnect processor(s) 171, memory 172, and communication interface 175. Communication interface 175 may be a network interface configured to support communication between device monitoring and management computer system 170 and one or more networks (e.g., organization network 180, public network 190, or the like). Memory 172 may include one or more program modules having instructions that when executed by processor(s) 171 cause device monitoring and management computer system 170 to perform one or more functions described herein and/or one or more databases that may store and/or otherwise maintain information which may be used by such program modules and/or processor(s) 171. In some instances, the one or more program modules and/or databases may be stored by and/or maintained in different memory units of device monitoring and management computer system 170 and/or by different computing devices that may form and/or otherwise make up device monitoring and management computer system 170. For example, memory 172 may include a device monitoring and management module 173 and a device monitoring and management database 174. Device monitoring and management module 173 may provide and/or perform one or more functions that may enable device monitoring and management computer system 170 to monitor and/or manage one or more mobile computing devices (which may, e.g., include requesting and/or monitoring device state information from one or more computing devices, such as customer mobile device 150 and customer mobile device 160). Device monitoring and management database 174 may store device state information and/or other information that may be created and/or used by device monitoring and management computer system 170 in performing one or more functions.

Figure 2A:
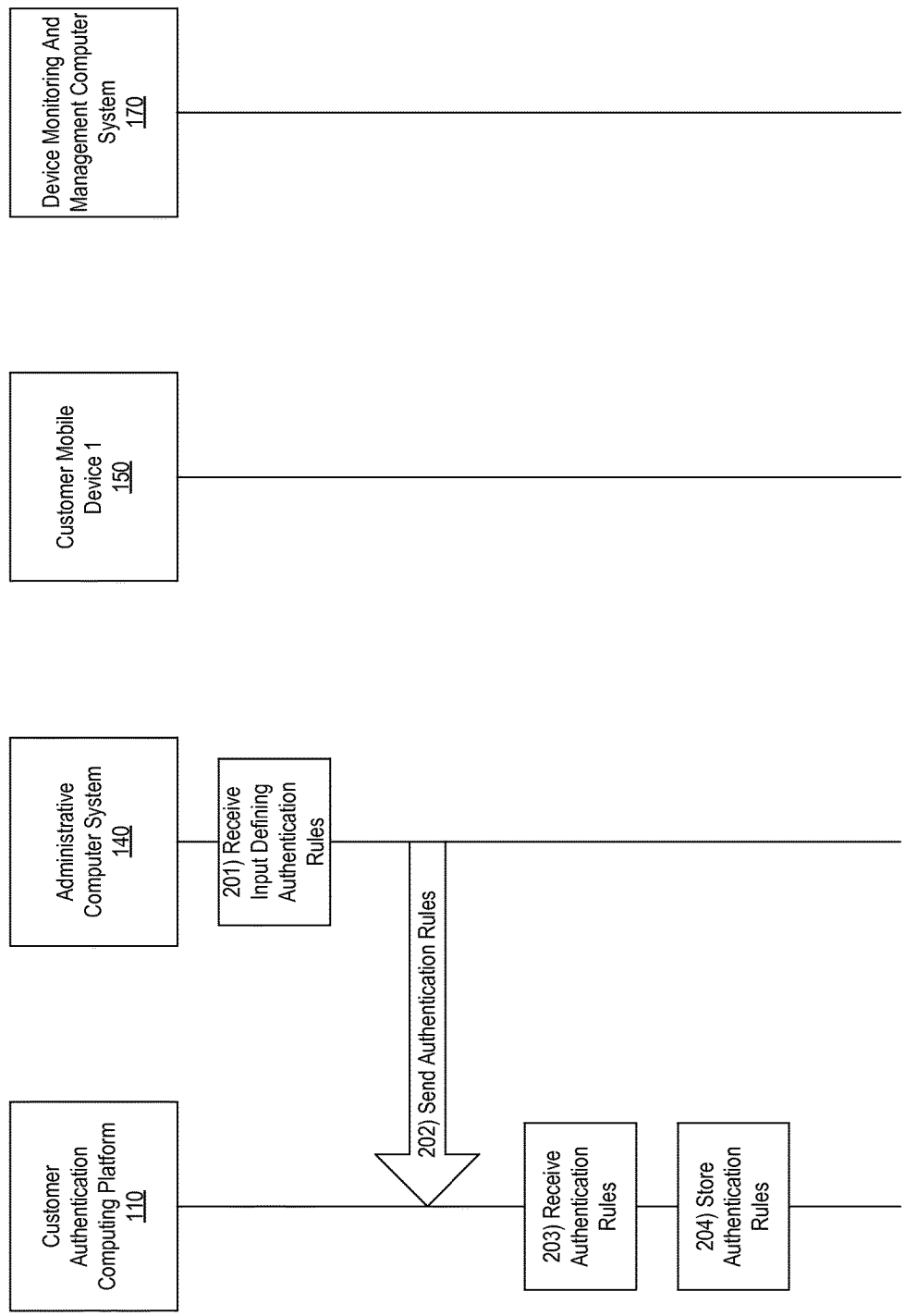

FIGS. 2A-2I depict an illustrative event sequence for selectively enabling and disabling biometric authentication in accordance with one or more example embodiments. Referring to FIG. 2A, at step 201, administrative computer system 140 may receive input defining one or more authentication rules. For example, at step 201, administrative computer system 140 may receive input from a user of administrative computer system 140 defining one or more authentication rules, which may specify conditions for how and/or when certain users may be authenticated to an online banking portal, including circumstances in which biometric authentication may be selectively enabled and/or disabled for certain users and/or devices. At step 202, administrative computer system 140 may send authentication rules info to customer authentication computing platform 110 (e.g., based on the input received at step 201). Such authentication rules information may, for instance, include the input received at step 201 and/or may include other information created by administrative computer system 140 based on the input received at step 201.

At step 203, customer authentication computing platform 110 may receive the authentication rules information from administrative computer system 140. At step 204, customer authentication computing platform 110 may store the authentication rules information received from administrative computer system 140. For example, at step 204, customer authentication computing platform 110 may store the authentication rules information received from administrative computer system 140 so that the authentication rules defined by the user of administrative computer system 140 can be used in selectively enabling and/or disabling biometric authentication for certain users and/or devices, as illustrated below.

Figure 2B:
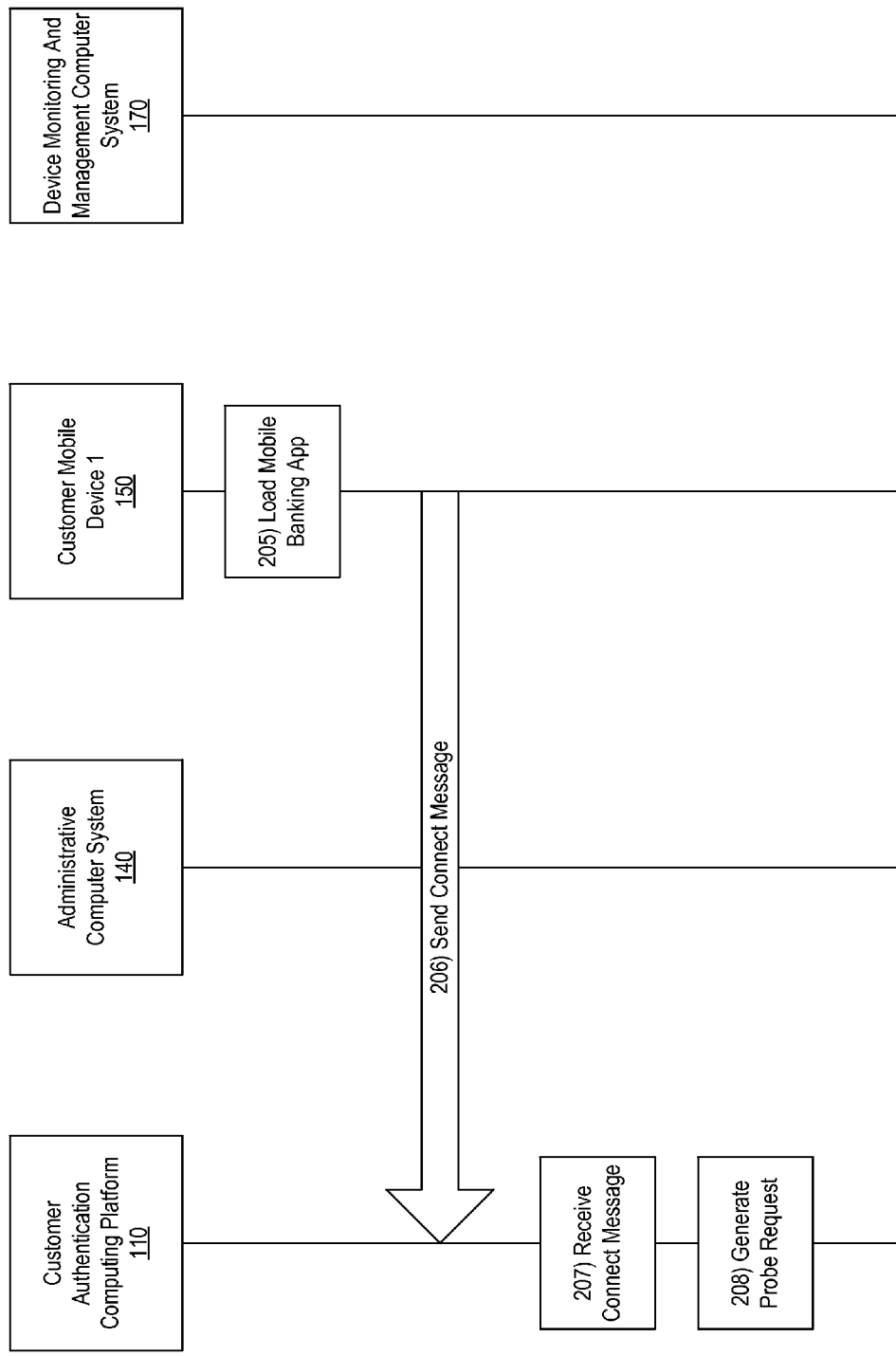

Referring to FIG. 2B, at step 205, customer mobile device 150 may load a mobile banking application. For example, at step 205, customer mobile device 150 may load a mobile banking application based on such an application being downloaded, installed on, and/or updated on customer mobile device 150 and/or based on a user command requesting to open such an application on customer mobile device 150. At step 206, customer mobile device 150 may send a connect message to customer authentication computing platform 110. Such a connect message may, for example, include a request from customer mobile device 150 and/or the mobile banking application loaded by customer mobile device 150 at step 205 to authenticate with and/or access an online banking portal and/or mobile banking information maintained by a financial institution operating customer authentication computing platform 110 and/or customer portal computer system 120 and/or account management computer system 130.

At step 207, customer authentication computing platform 110 may receive the connect message from customer mobile device 150. For example, at step 207, customer authentication computing platform 110 may receive, via the communication interface (e.g., communication interface 116), and from the mobile computing device (e.g., customer mobile device 150), a connect message comprising one or more identifiers associated with the mobile computing device (e.g., customer mobile device 150). Such identifiers may, for example, include a unique device identifier that has been assigned to customer mobile device 150, a mobile phone number used by and/or associated with customer mobile device 150, a username or other user identifier that has been assigned a user of customer mobile device 150, and/or one or more other identifiers associated with customer mobile device 150.

At step 208, customer authentication computing platform 110 may generate a probe request (e.g., for customer mobile device 150 based on the connect message received from customer mobile device 150). For example, based on receiving the connect message comprising the one or more identifiers associated with the mobile computing device (e.g., customer mobile device 150), customer authentication computing platform 110 may generate a probe request for the mobile computing device (e.g., customer mobile device 150), and the probe request may be configured to cause the device monitoring and management computer system (e.g., device monitoring and management computer system 170) to collect state information from the mobile computing device (e.g., customer mobile device 150).

Figure 2C:
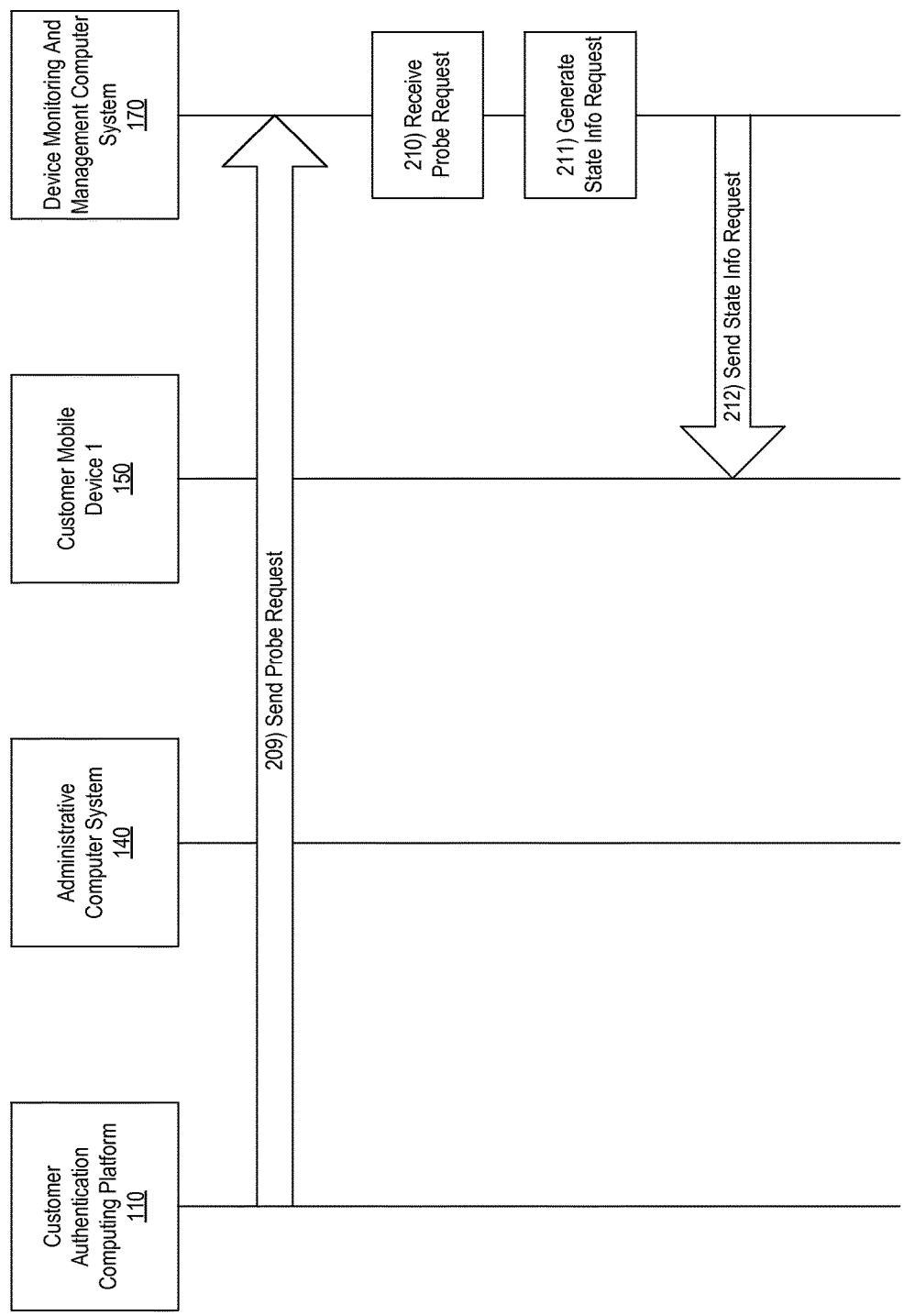

Referring to FIG. 2C, at step 209, customer authentication computing platform 110 may send the probe request to device monitoring and management computer system 170. For example, at step 209, customer authentication computing platform 110 may send, via the communication interface (e.g., communication interface 116), and to the device monitoring and management computer system (e.g., device monitoring and management computer system 170), the probe request generated for the mobile computing device (e.g., customer mobile device 150).

At step 210, device monitoring and management computer system 170 may receive the probe request from customer authentication computing platform 110. At step 211, device monitoring and management computer system 170 may generate a state information request (e.g., based on the probe request received from customer authentication computing platform 110 at step 210). For example, at step 211, device monitoring and management computer system 170 may generate a state information request for customer mobile device 150, which may include one or more commands and/or other information requesting current and/or updated device state information from customer mobile device 150. At step 212, device monitoring and management computer system 170 may send the state information request to customer mobile device 150.

Referring to FIG. 2D, at step 213, customer mobile device 150 may receive the state information request from device monitoring and management computer system 170. At step 214, customer mobile device 150 may collect device state information. For example, at step 214, a mobile device management agent on customer mobile device 150 may collect current device state information for customer mobile device 150, a mobile banking application on customer mobile device 150 may collect such state information, and/or one or more other programs and/or utilities may collect such state information. The state information may, in some instances, include information indicating whether customer mobile device 150 has been jailbroken or rooted, information indicating the current geographic location of customer mobile device 150, information identifying which programs are installed and/or running on customer mobile device 150, information identifying the current user of customer mobile device 150, and/or other information associated with the current operating state of customer mobile device 150.

At step 215, customer mobile device 150 may send the collected device state information to device monitoring and management computer system 170. At step 216, device monitoring and management computer system 170 may receive the device state information from customer mobile device 150.

Figure 2E:
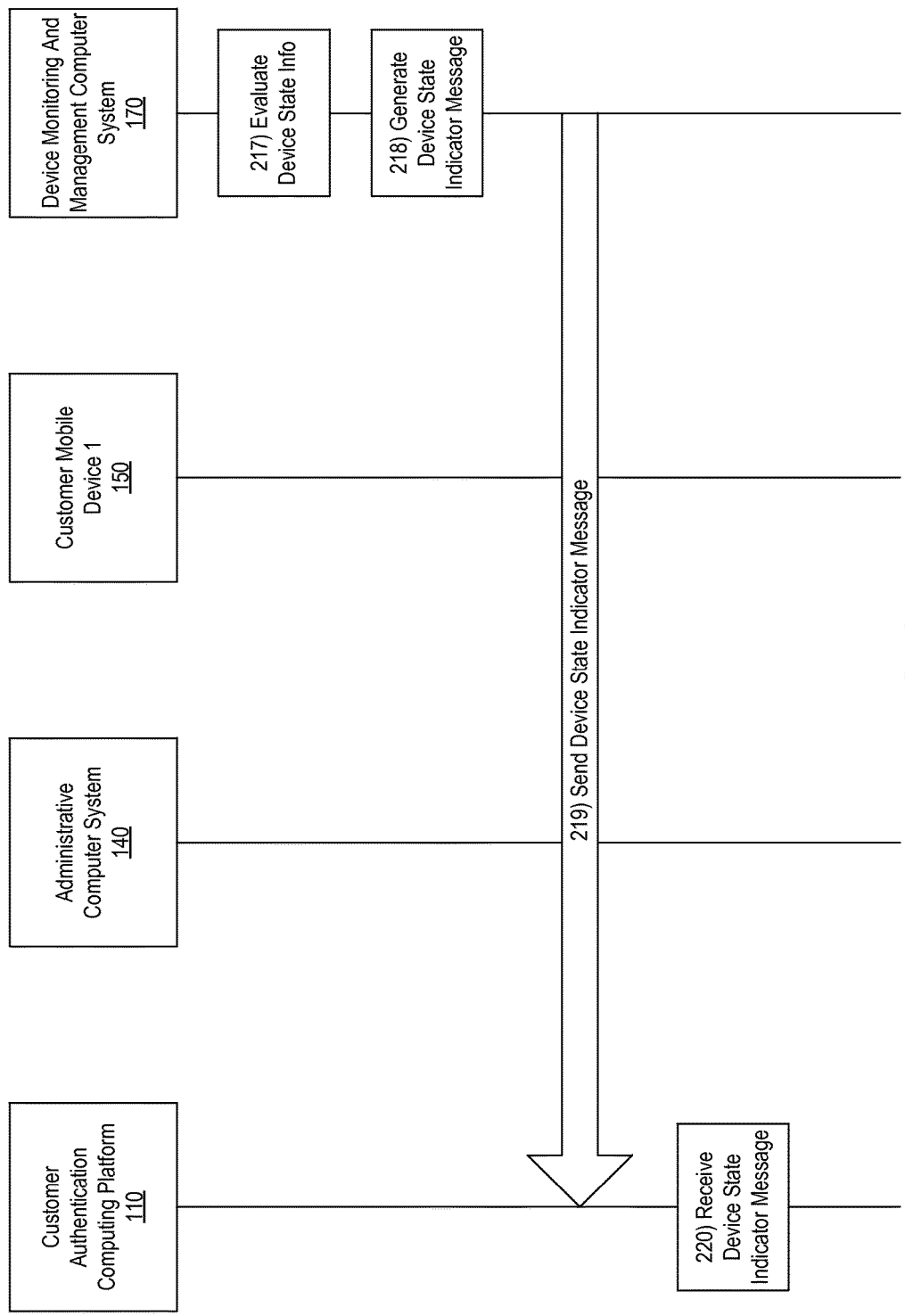

Referring to FIG. 2E, at step 217, device monitoring and management computer system 170 may evaluate the device state information received from customer mobile device 150. In evaluating the device state information received from customer mobile device 150, device monitoring and management computer system 170 may, for example, analyze the device state information received from customer mobile device 150 so as to determine a risk profile or qualitative risk level for customer mobile device 150 (e.g., low risk, medium risk, high risk, or the like). Additionally or alternatively, in evaluating the device state information received from customer mobile device 150, device monitoring and management computer system 170 may, for example, analyze the device state information received from customer mobile device 150 so as to calculate a risk score for customer mobile device 150 (e.g., on a numerical scale from zero to one hundred).

At step 218, device monitoring and management computer system 170 may generate a device state indicator message (e.g., based on the evaluation of the device state information received from customer mobile device 150 performed at step 217). For example, in generating a device state indicator message at step 218, device monitoring and management computer system 170 may create and/or form a data structure or object that includes information indicating whether customer mobile device 150 has been jailbroken or rooted, information indicating the current geographic location of customer mobile device 150, information identifying which programs are installed and/or running on customer mobile device 150, information identifying the current user of customer mobile device 150, and/or other information associated with customer mobile device 150. In some instances, the device state indicator message may include some or all of the device state information received from customer mobile device 150 at step 216. Additionally or alternatively, the device state indicator message may include a risk level indicator determined by device monitoring and management computer system 170 for customer mobile device 150 (e.g., indicating a low, medium, or high level of risk for customer mobile device 150) and/or a risk score calculated by device monitoring and management computer system 170 for customer mobile device 150. At step 219, device monitoring and management computer system 170 may send the device state indicator message to customer authentication computing platform 110.

At step 220, customer authentication computing platform 110 may receive the device state indicator message from device monitoring and management computer system 170. For example, at step 220, customer authentication computing platform 110 may receive, via the communication interface (e.g., communication interface 116), and from a device monitoring and management computer system (e.g., device monitoring and management computer system 170), a device state indicator message comprising device state information associated with a mobile computing device (e.g., customer mobile device 150).

In some embodiments, the device state information associated with the mobile computing device may include an indication of whether the mobile computing device has been jailbroken. For example, the device state information associated with the mobile computing device (e.g., the device state information associated with customer mobile device 150 and included in the device state indicator message received from device monitoring and management computer system 170) may include an indication of whether the mobile computing device (e.g., customer mobile device 150) has been jailbroken. For example, if one or more hardware restrictions imposed by an operating system on customer mobile device 150 have been removed (e.g., using one or more software exploits so as to permit root access to the file system, operating system, and/or device manager on customer mobile device 150), then the device state information associated with customer mobile device 150 may indicate that customer mobile device 150 has been jailbroken.

In some embodiments, the device state information associated with the mobile computing device may include an indication of whether the mobile computing device has been rooted. For example, the device state information associated with the mobile computing device (e.g., the device state information associated with customer mobile device 150 and included in the device state indicator message received from device monitoring and management computer system 170) may include an indication of whether the mobile computing device (e.g., customer mobile device 150) has been rooted. For example, if one or more users have attained privileged control, administrative permissions, and/or root access over various subsystems of customer mobile device 150, then the device state information associated with customer mobile device 150 may indicate that customer mobile device 150 has been rooted.

In some embodiments, the device state information associated with the mobile computing device may include location information identifying a current geographic location of the mobile computing device. For example, the device state information associated with the mobile computing device (e.g., the device state information associated with customer mobile device 150 and included in the device state indicator message received from device monitoring and management computer system 170) may include location information identifying a current geographic location of the mobile computing device (e.g., customer mobile device 150).

In some embodiments, the device state information associated with the mobile computing device may include application information identifying one or more programs that are installed or running on the mobile computing device. For example, the device state information associated with the mobile computing device (e.g., the device state information associated with customer mobile device 150 and included in the device state indicator message received from device monitoring and management computer system 170) may include application information identifying one or more programs that are installed or running on the mobile computing device (e.g., customer mobile device 150).

In some embodiments, the device state information associated with the mobile computing device may include user information identifying a current user of the mobile computing device. For example, the device state information associated with the mobile computing device (e.g., the device state information associated with customer mobile device 150 and included in the device state indicator message received from device monitoring and management computer system 170) may include user information identifying a current user of the mobile computing device (e.g., customer mobile device 150).

In some embodiments, the device state information associated with the mobile computing device may be collected by a management agent executed on the mobile computing device. For example, the device state information associated with the mobile computing device (e.g., the device state information associated with customer mobile device 150 and included in the device state indicator message received from device monitoring and management computer system 170) may be collected by a management agent executed on the mobile computing device (e.g., customer mobile device 150).

In some embodiments, the device state information associated with the mobile computing device may be collected by the mobile banking application executed on the mobile computing device. For example, the device state information associated with the mobile computing device (e.g., the device state information associated with customer mobile device 150 and included in the device state indicator message received from device monitoring and management computer system 170) may be collected by the mobile banking application executed on the mobile computing device (e.g., customer mobile device 150).

Referring to FIG. 2F, at step 221, customer authentication computing platform 110 may set a biometric authentication flag (e.g., based on the device state indicator message received at step 220). For example, at step 221, customer authentication computing platform 110 may set a biometric authentication flag for the mobile computing device (e.g., customer mobile device 150) based on the device state indicator message received from the device monitoring and management computer system (e.g., device monitoring and management computer system 170). The biometric authentication flag set by customer authentication computing platform 110 for customer mobile device 150 may, for instance, control whether customer authentication computing platform 110 allows customer mobile device 150 to use one or more biometric functions when authenticating with customer authentication computing platform 110 and/or one or more other computer systems associated with customer authentication computing platform 110, such as customer portal computer system 120 and account management computer system 130. Such biometric functions may include fingerprint biometric functions and/or other biometric functions, such as voice biometrics, facial scan biometrics, retinal scan biometrics, and/or the like. In setting a biometric authentication flag for the mobile computing device (e.g., customer mobile device 150), customer authentication computing platform 110 may determine whether to allow biometric authentication for the mobile computing device (e.g., customer mobile device 150) based on a device risk profile for the mobile computing device (e.g., customer mobile device 150). Such a device risk profile for the mobile computing device (e.g., customer mobile device 150) may be included in the device state indicator message received at step 220 and/or may be determined by customer authentication computing platform 110 based on an analysis of information included in the device state indicator message received at step 220. For instance, authentication rules engine 114 of customer authentication computing platform 110 may evaluate information included in the device state indicator message received at step 220 to create and/or determine a device risk profile for the mobile computing device (e.g., customer mobile device 150), which may dictate how to authenticate the user of the mobile computing device (e.g., customer mobile device 150). In some instances, customer authentication computing platform 110 may determine (e.g., based on such evaluation and/or analysis) to selectively enable biometric authentication for the mobile computing device (e.g., customer mobile device 150), while in other instances, customer authentication computing platform 110 may determine (e.g., based on such evaluation and/or analysis) to selectively disable biometric authentication for the mobile computing device (e.g., customer mobile device 150).

At step 222, customer authentication computing platform 110 may set one or more additional authentication flags (e.g., based on the device state indicator message received at step 220). For example, at step 222, customer authentication computing platform 110 may set one or more additional authentication flags for the mobile computing device (e.g., customer mobile device 150) based on the device state indicator message received from the device monitoring and management computer system (e.g., device monitoring and management computer system 170). For instance, if customer authentication computing platform 110 determines that customer mobile device 150 is in a relatively high risk state, customer authentication computing platform 110 may set one or more additional flags that may require the user of customer mobile device 150 to take additional steps when authenticating, such as answering one or more challenge questions, providing a one-time passcode, or the like. An example of the additional authentication flags that may be set by customer authentication computing platform 110 depending on the device risk profile and/or risk score for customer mobile device 150 is illustrated in the following table.

TABLE A

| Device Risk Score | Device Risk Profile | Authentication Flags |
| --- | --- | --- |
| 90 or higher | Low Risk | Biometric authentication is allowed. Additional authentication prompts are not required. |
| 70 to 90 | Medium Risk | Biometric authentication is allowed. Username and passcode are not required. Additional authentication prompts, such as one-time passcode and/or one or more challenge questions, are required. |
| 70 or lower | High Risk | Biometric authentication is not allowed. Username and passcode are required. Additional authentication prompts, such as one-time passcode and/or one or more challenge questions, are required. |

At step 223, customer authentication computing platform 110 may generate an authentication functionality message (e.g., based on the biometric authentication flag set at step 221, based on the one or more additional authentication flags set at step 222, and/or based on one or more other factors). For example, at step 223, customer authentication computing platform 110 may generate an authentication functionality message for the mobile computing device (e.g., customer mobile device 150) based on the biometric authentication flag set for the mobile computing device (e.g., customer mobile device 150), and the authentication functionality message may be configured to selectively enable or disable one or more biometric authentication functions provided by the mobile computing device (e.g., customer mobile device 150). In generating an authentication functionality message for the mobile computing device (e.g., customer mobile device 150) based on the biometric authentication flag set for the mobile computing device (e.g., customer mobile device 150), customer authentication computing platform 110 may create and/or form a data structure or object that includes one or more commands and/or other information that cause the mobile computing device (e.g., customer mobile device 150) and/or a mobile banking application executed on the mobile computing device (e.g., customer mobile device 150) to selectively enable or disable one or more biometric authentication functions in accordance with the biometric authentication flag set for the mobile computing device (e.g., customer mobile device 150).

In some embodiments, the authentication functionality message may be configured to selectively disable a biometric authentication function of a mobile banking application executed on the mobile computing device. For example, the authentication functionality message (which may, e.g., be generated by customer authentication computing platform 110 at step 223) may be configured to selectively disable a biometric authentication function of a mobile banking application executed on the mobile computing device (e.g., customer mobile device 150). In some instances, the mobile banking application may be provided by a financial institution, and the mobile computing device may be used by a customer of the financial institution. For example, the mobile banking application (which may, e.g., be executed on customer mobile device 150) may be provided by a financial institution operating customer authentication computing platform 110, and the mobile computing device (e.g., customer mobile device 150) may be used by a customer of the financial institution operating customer authentication computing platform 110.

In some embodiments, the biometric authentication function of the mobile banking application executed on the mobile computing device may include a fingerprint biometric authentication function. For example, the biometric authentication function of the mobile banking application executed on the mobile computing device (e.g., customer mobile device 150) may include a fingerprint biometric authentication function that allows a user of the mobile computing device (e.g., customer mobile device 150) to be authenticated based on a scan of their fingerprint.

In some embodiments, the biometric authentication function of the mobile banking application executed on the mobile computing device may include a voice biometric authentication function. For example, the biometric authentication function of the mobile banking application executed on the mobile computing device (e.g., customer mobile device 150) may include a voice biometric authentication function that allows a user of the mobile computing device (e.g., customer mobile device 150) to be authenticated based on a sample of their voice.

In some embodiments, the biometric authentication function of the mobile banking application executed on the mobile computing device may include a facial biometric authentication function. For example, the biometric authentication function of the mobile banking application executed on the mobile computing device (e.g., customer mobile device 150) may include a facial biometric authentication function that allows a user of the mobile computing device (e.g., customer mobile device 150) to be authenticated based on a scan or image of their face.

In some embodiments, the biometric authentication function of the mobile banking application executed on the mobile computing device may include a retinal biometric authentication function. For example, the biometric authentication function of the mobile banking application executed on the mobile computing device (e.g., customer mobile device 150) may include a retinal biometric authentication function that allows a user of the mobile computing device (e.g., customer mobile device 150) to be authenticated based on a scan or image of their retina.

At step 224, customer authentication computing platform 110 may send the authentication functionality message to customer mobile device 150. For example, at step 224, customer authentication computing platform 110 may send, via the communication interface (e.g., communication interface 116), and to the mobile computing device (e.g., customer mobile device 150), the authentication functionality message generated for the mobile computing device (e.g., customer mobile device 150).

Figure 2G:
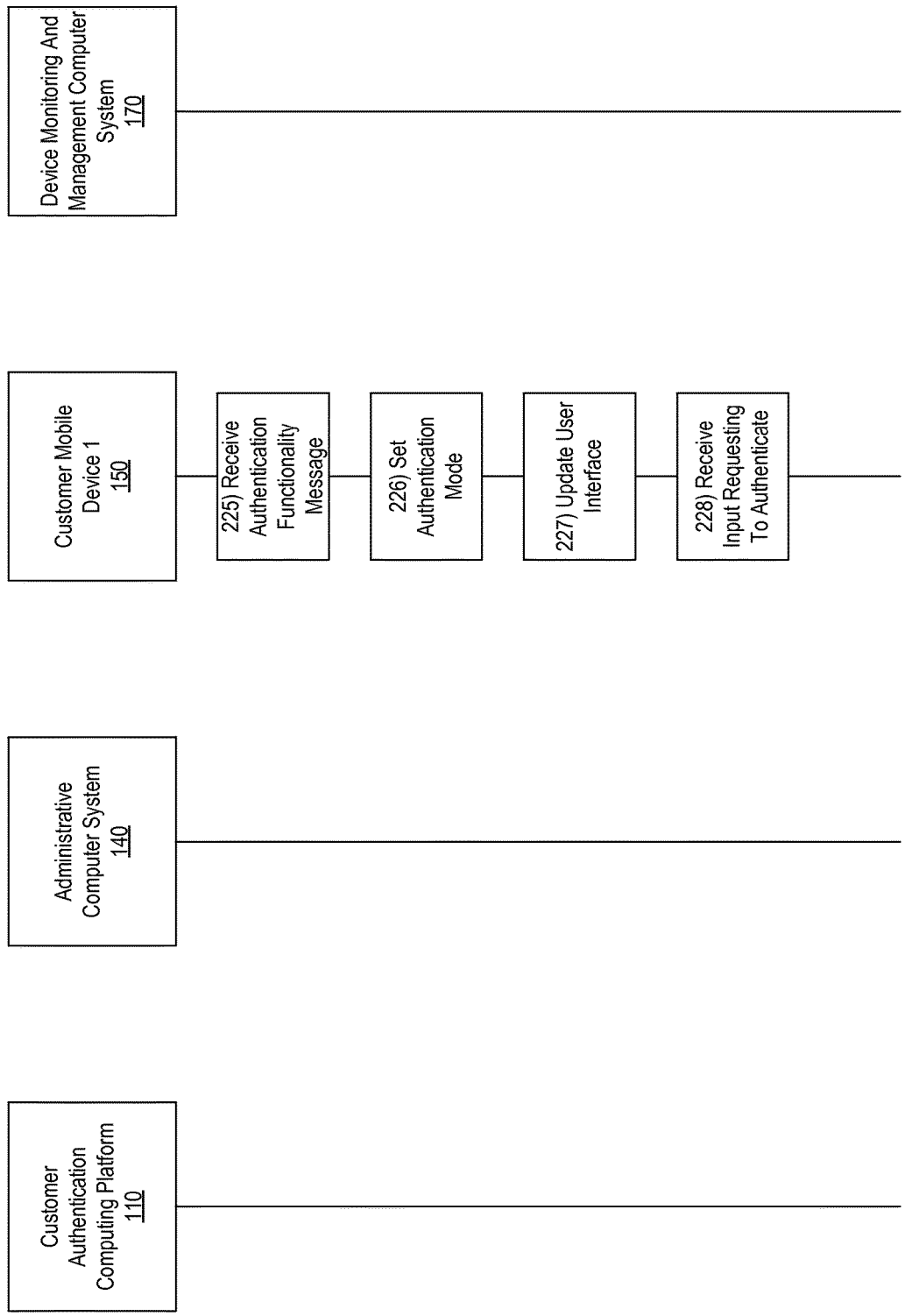

Referring to FIG. 2G, at step 225, customer mobile device 150 may receive the authentication functionality message from customer authentication computing platform 110. At step 226, customer mobile device 150 may set an authentication mode (e.g., based on the authentication functionality message received from customer authentication computing platform 110 at step 225). For example, at step 226, customer mobile device 150 may set an authentication mode that enables or disables one or more biometric authentication functions and/or enrollment in a biometric authentication program (which may, e.g., allow use of one or more biometric authentication functions in connection with one or more applications executed on customer mobile device 150) based on the authentication functionality message received from customer authentication computing platform 110 at step 225.

Figure 3:
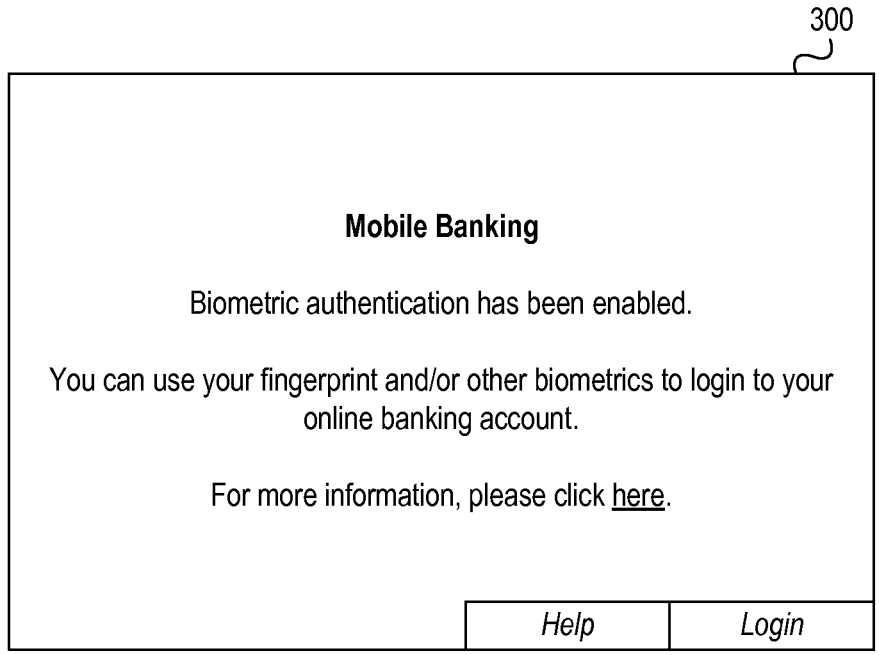
FIGS. 3 and 4 depict example graphical user interfaces for selectively enabling and disabling biometric authentication in accordance with one or more example embodiments.
Figure 4:
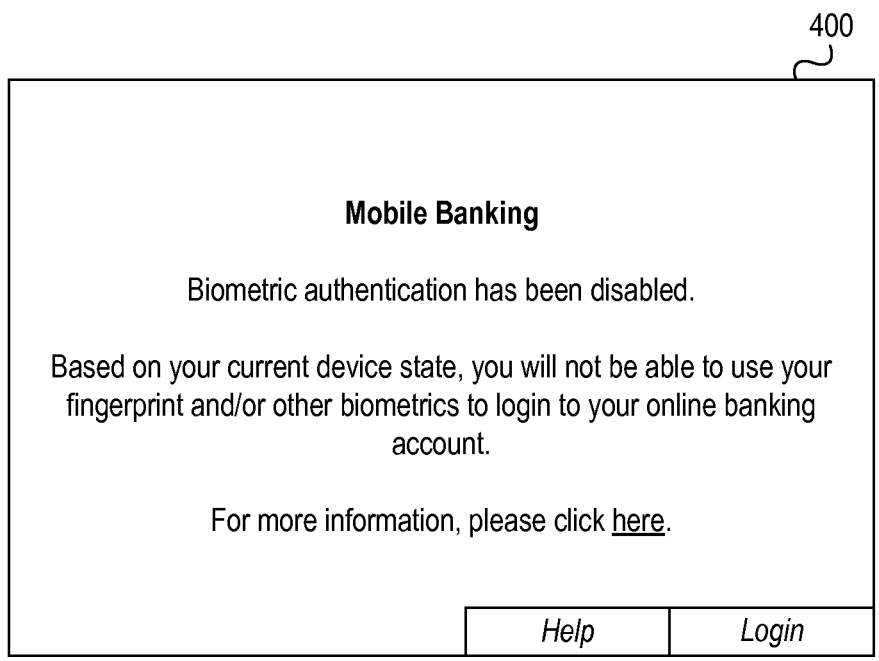

At step 227, customer mobile device 150 may update one or more user interfaces (e.g., based on the authentication mode set at step 226). For example, at step 227, customer mobile device 150 may update one or more user interfaces to notify the user of customer mobile device 150 that one or more biometric authentication functions have been enabled and/or disabled. For example, in updating one or more user interfaces at step 227, customer mobile device 150 may display, cause to be displayed, and/or otherwise present a graphical user interface similar to graphical user interface 300, which is illustrated in FIG. 3. As seen in FIG. 3, graphical user interface 300 may include information notifying the user of customer mobile device 150 that one or more biometric authentication functions have been enabled. As another example, in updating one or more user interfaces at step 227, customer mobile device 150 may display, cause to be displayed, and/or otherwise present a graphical user interface similar to graphical user interface 400, which is illustrated in FIG. 4. As seen in FIG. 4, graphical user interface 400 may include information notifying the user of customer mobile device 150 that one or more biometric authentication functions have been disabled.

At step 228, customer mobile device 150 may receive input requesting to authenticate. For example, at step 228, customer mobile device 150 may receive input requesting to authenticate via the mobile banking application so as to access, view, and/or otherwise interact with financial account information available via the mobile banking application.

Figure 2H:
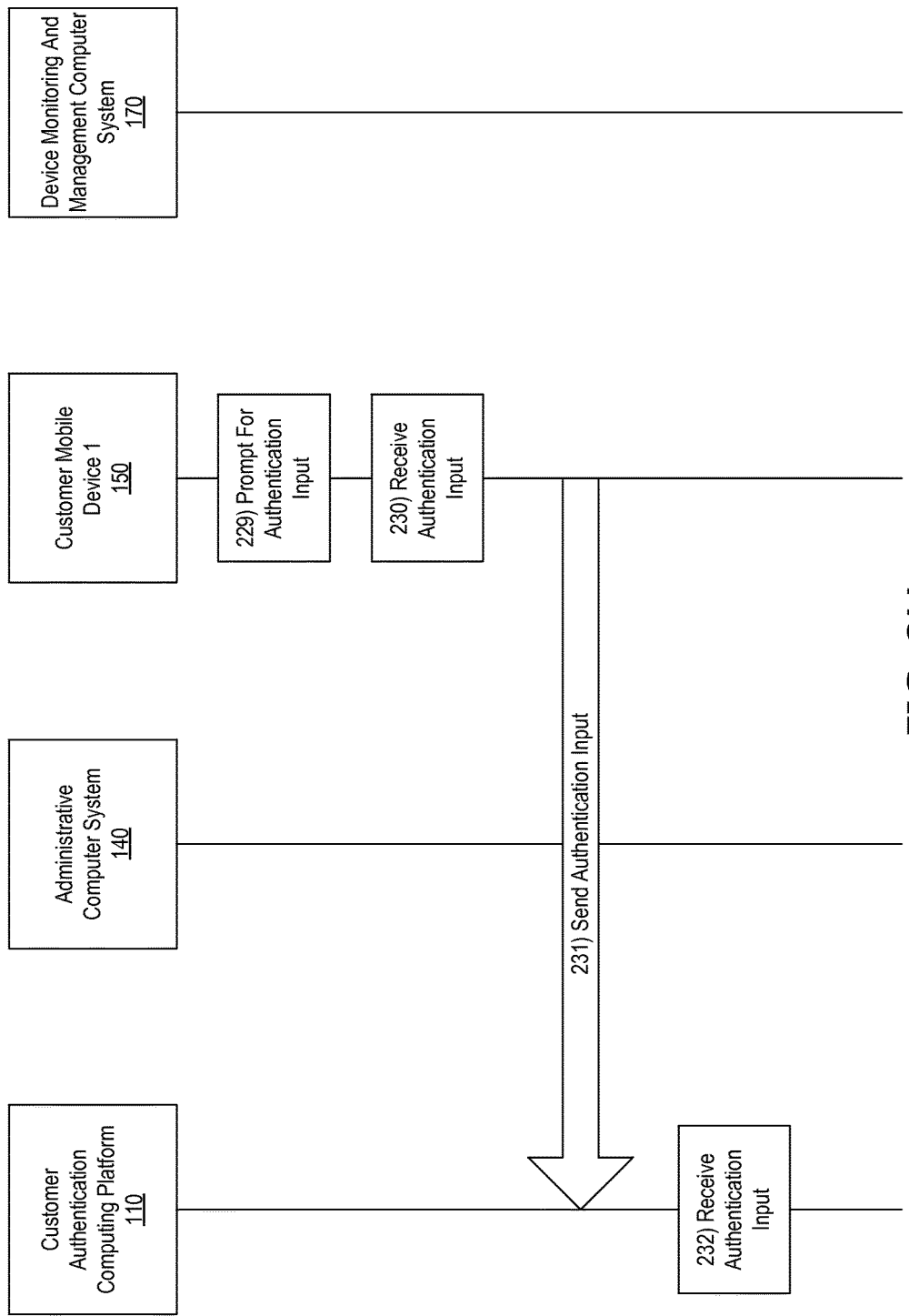

Referring to FIG. 2H, at step 229, customer mobile device 150 may prompt the user of customer mobile device 150 for authentication input (e.g., based on the authentication mode set at step 226). For example, depending on the authentication mode set at step 226, customer mobile device 150 may, at step 229, prompt the user of customer mobile device 150 to provide a username and/or password, biometric input, one or more responses to one or more challenge questions, a one-time passcode, and/or other authentication input.

At step 230, customer mobile device 150 may receive authentication input (e.g., from the user of customer mobile device 150). Some authentication input, such as biometric input, may be validated by customer mobile device 150 in some instances, while other authentication input, such as a username, password, and/or one-time passcode, may be validated by customer authentication computing platform 110, as illustrated in greater detail below. At step 231, customer mobile device 150 may send authentication input information to customer authentication computing platform 110 (e.g., based on the authentication input received at step 230). For example, the authentication input information that customer mobile device 150 may send to customer authentication computing platform 110 at step 231 may include a username and/or password entered by the user of customer mobile device 150, an indication of whether biometric input received from the user of customer mobile device 150 was determined to be valid or invalid by customer mobile device 150, one or more responses to one or more challenge questions entered by the user of customer mobile device 150, a one-time passcode entered by the user of customer mobile device 150, and/or other authentication input entered and/or otherwise provided by the user of customer mobile device 150.

At step 232, customer authentication computing platform 110 may receive the authentication input information from customer mobile device 150. For example, at step 232, customer authentication computing platform 110 may receive, via the communication interface (e.g., communication interface 116), and from the mobile computing device (e.g., customer mobile device 150), authentication input information.

Figure 2I:
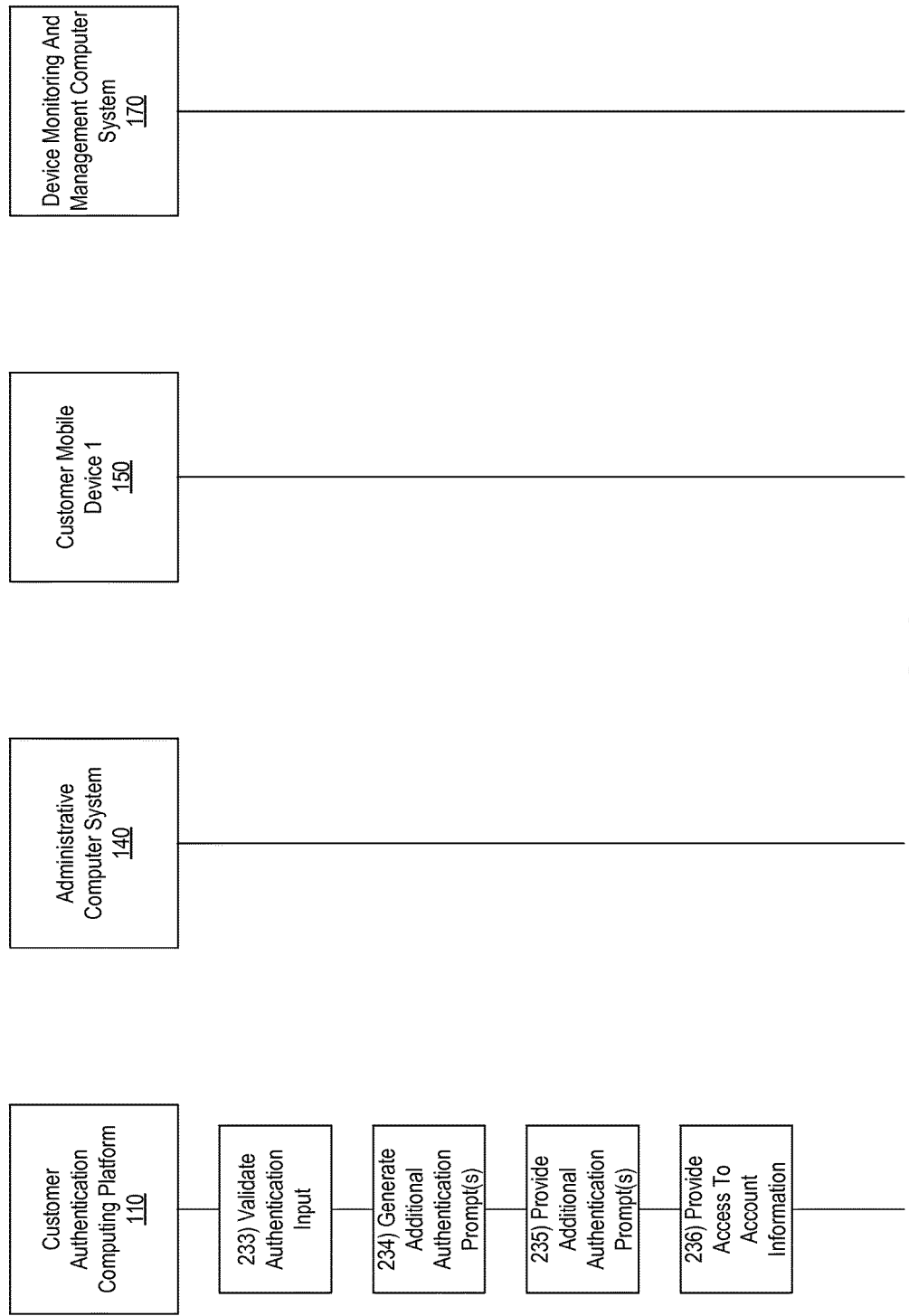

Referring to FIG. 2I, at step 233, customer authentication computing platform 110 may validate the authentication input information received from customer mobile device 150. For example, at step 233, customer authentication computing platform 110 may validate the authentication input information received from the mobile computing device (e.g., customer mobile device 150). In validating the authentication input information received from the mobile computing device (e.g., customer mobile device 150), customer authentication computing platform 110 may, for instance, determine whether a username and/or password entered by the user of customer mobile device 150 are correct, whether an indication of biometric input received from the user of customer mobile device 150 was determined to be valid by customer mobile device 150, whether one or more responses to one or more challenge questions entered by the user of customer mobile device 150 are valid, whether a one-time passcode entered by the user of customer mobile device 150 is valid, and/or whether other authentication input entered and/or otherwise provided by the user of customer mobile device 150 is valid. If such authentication input information is determined by customer authentication computing platform 110 to be invalid and/or otherwise incorrect, customer authentication computing platform 110 may generate and/or send one or more error messages to customer mobile device 150 and/or may prevent and/or deny access to customer mobile device 150. Alternatively, if such authentication input information is determined by customer authentication computing platform 110 to be valid and/or otherwise correct, the event sequence may continue as illustrated in FIG. 2I (e.g., and customer authentication computing platform 110 may allow and/or otherwise provide access to customer mobile device 150, depending on whether additional authentication prompts are required and/or satisfied, as illustrated below).

At step 234, customer authentication computing platform 110 may generate one or more additional authentication prompts based on the one or more additional authentication flags (which may, e.g., have been set at step 222). For example, at step 234, customer authentication computing platform 110 may generate one or more additional authentication prompts based on the one or more additional authentication flags set for the mobile computing device (e.g., customer mobile device 150). Such additional authentication prompts may, for instance, require the user of customer mobile device 150 to provide one or more additional credentials for authentication, such as one or more responses to one or more challenge questions, a one-time passcode, and/or the like. At step 235, customer authentication computing platform 110 may provide the one or more additional authentication prompts generated at step 234. For example, at step 235, customer authentication computing platform 110 may provide the one or more additional authentication prompts to the mobile computing device (e.g., customer mobile device 150). In providing the one or more additional authentication prompts to the mobile computing device (e.g., customer mobile device 150), customer authentication computing platform 110 may exchange data with customer mobile device 150 to cause customer mobile device 150 to present the generated prompts and/or may validate input provided by the user of customer mobile device 150 in response to the prompts.

At step 236, customer authentication computing platform 110 may provide access to account information (e.g., based on validating the authentication input at step 233, based on validating responses to the one or more additional authentication prompts provided at step 235, and/or based on one or more other factors). For example, at step 236, based on validating the authentication input information received from the mobile computing device (e.g., customer mobile device 150), customer authentication computing platform 110 may provide, to the mobile computing device (e.g., customer mobile device 150), online banking information associated with one or more financial accounts maintained by the financial institution for the customer of the financial institution. In providing such information, customer authentication computing platform 110 may, for instance, allow the user of customer mobile device 150 to access an online banking portal provided by customer portal computer system 120, allow the user of customer mobile device 150 to access account information maintained by account management computer system 130, and/or allow the user of customer mobile device 150 to access one or more other resources (which may, e.g., be associated with a financial institution operating customer authentication computing platform 110).

In some instances, an event sequence similar to the one described above may be repeated and/or performed in the future, for example, when the user of customer mobile device 150 again opens a mobile banking application executed on customer mobile device 150. Additionally or alternatively, an event sequence similar to the one described above may be performed with respect to another customer and/or user device, for example, when a user of customer mobile device 160 opens a mobile banking application executed on customer mobile device 160.

Figure 5:
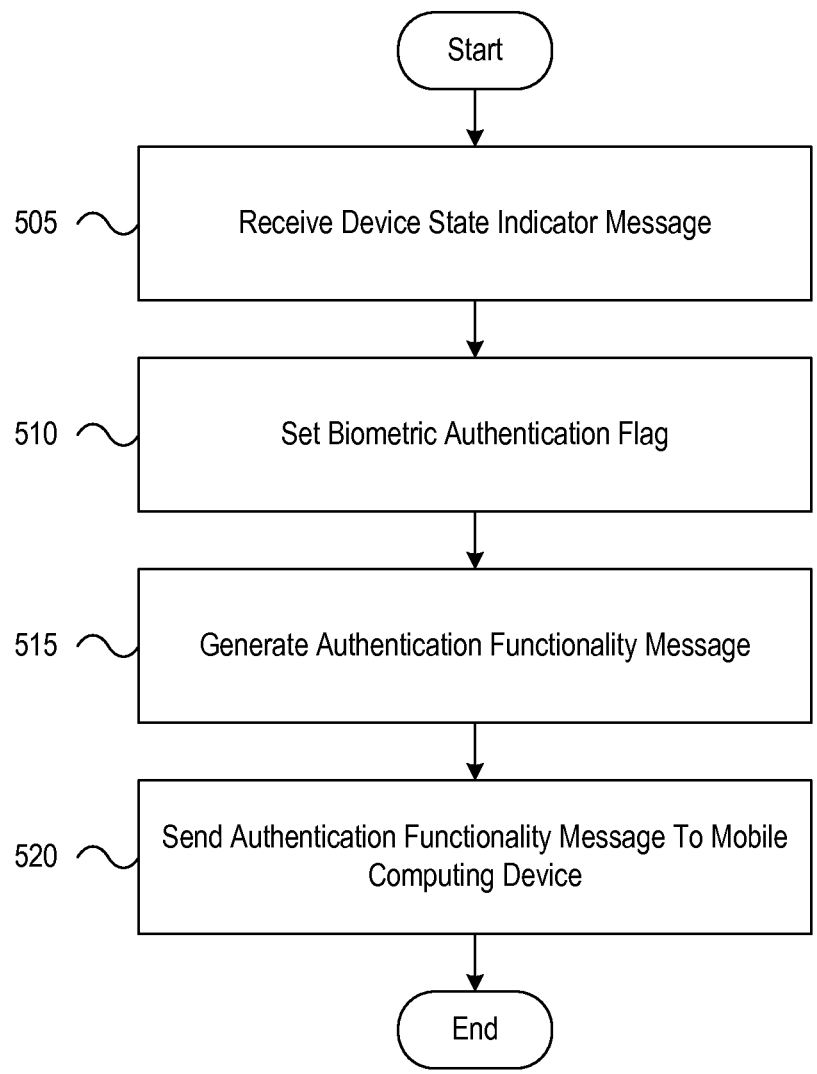
FIG. 5 depicts an illustrative method for selectively enabling and disabling biometric authentication in accordance with one or more example embodiments.

FIG. 5 depicts an illustrative method for selectively enabling and disabling biometric authentication in accordance with one or more example embodiments. Referring to FIG. 5, at step 505, a computing platform having at least one processor, a communication interface, and a memory may receive, via the communication interface, and from a device monitoring and management computer system, a device state indicator message comprising device state information associated with a mobile computing device. At step 510, the computing platform may set a biometric authentication flag for the mobile computing device based on the device state indicator message received from the device monitoring and management computer system. At step 515, the computing platform may generate an authentication functionality message for the mobile computing device based on the biometric authentication flag set for the mobile computing device. The authentication functionality message may be configured to selectively enable or disable one or more biometric authentication functions provided by the mobile computing device. At step 520, the computing platform may send, via the communication interface, and to the mobile computing device, the authentication functionality message generated for the mobile computing device.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A system comprising:
   at least one processor;
   a communication interface communicatively coupled to the at least one processor; and
   memory storing computer-readable instructions that, when executed by the at least one processor, cause the system to:
   receive, via the communication interface, from a device monitoring and management computer system, a device state indicator message comprising device state information associated with a mobile computing device, wherein the device state information associated with the mobile computing device comprises information indicating that the mobile computing device has been jailbroken or rooted;
   set a biometric authentication flag for the mobile computing device based on the device state indicator message received from the device monitoring and management computer system;
   generate an authentication functionality message for the mobile computing device based on the biometric authentication flag set for the mobile computing device, the authentication functionality message being configured to selectively disable a biometric authentication function of a mobile banking application executed on the mobile computing device based on the information indicating that the mobile computing device has been jailbroken or rooted, wherein the biometric authentication function of the mobile banking application is used when authenticating with the system to access mobile banking information maintained by a financial institution operating the system; and
   send, via the communication interface, to the mobile computing device, the authentication functionality message generated for the mobile computing device, wherein sending the authentication functionality message generated for the mobile computing device to the mobile computing device causes the mobile computing device to disable the biometric authentication function of the mobile banking application executed on the mobile computing device.

2. The system of claim 1, wherein the mobile banking application is provided by the financial institution operating the system, and the mobile computing device is used by a customer of the financial institution operating the system.

3. The system of claim 1, wherein the device state information associated with the mobile computing device comprises location information identifying a current geographic location of the mobile computing device.

4. The system of claim 1, wherein the device state information associated with the mobile computing device comprises application information identifying one or more programs that are installed or running on the mobile computing device.

5. The system of claim 1, wherein the device state information associated with the mobile computing device comprises user information identifying a current user of the mobile computing device.

6. The system of claim 1, wherein the memory stores additional computer-readable instructions that, when executed by the at least one processor, cause the system to:
   prior to receiving the device state indicator message comprising the device state information associated with the mobile computing device:
     receive, via the communication interface, from the mobile computing device, a connect message comprising one or more identifiers associated with the mobile computing device;
     based on receiving the connect message comprising the one or more identifiers associated with the mobile computing device, generate a probe request for the mobile computing device, the probe request being configured to cause the device monitoring and management computer system to collect state information from the mobile computing device; and
     send, via the communication interface, to the device monitoring and management computer system, the probe request generated for the mobile computing device.

7. The system of claim 6, wherein the device state information associated with the mobile computing device is collected by a management agent executed on the mobile computing device.

8. The system of claim 6, wherein the device state information associated with the mobile computing device is collected by the mobile banking application executed on the mobile computing device.

9. The system of claim 2, wherein the memory stores additional computer-readable instructions that, when executed by the at least one processor, cause the system to:
   set one or more additional authentication flags for the mobile computing device based on the device state indicator message received from the device monitoring and management computer system.

10. The system of claim 9, wherein the memory stores additional computer-readable instructions that, when executed by the at least one processor, cause the system to:
    after sending the authentication functionality message generated for the mobile computing device to the mobile computing device:
      receive, via the communication interface, from the mobile computing device, authentication input information;
      validate the authentication input information received from the mobile computing device; and
      based on validating the authentication input information received from the mobile computing device, provide, to the mobile computing device, online banking information associated with one or more financial accounts maintained by the financial institution for the customer of the financial institution.

11. The system of claim 10, wherein the memory stores additional computer-readable instructions that, when executed by the at least one processor, cause the system to:

prior to providing the online banking information to the mobile computing device:
  generate one or more additional authentication prompts based on the one or more additional authentication flags set for the mobile computing device; and
  provide the one or more additional authentication prompts to the mobile computing device.

12. The system of claim 1, wherein the biometric authentication function of the mobile banking application executed on the mobile computing device comprises a fingerprint biometric authentication function.

13. The system of claim 1, wherein the biometric authentication function of the mobile banking application executed on the mobile computing device comprises a voice biometric authentication function.

14. The system of claim 1, wherein the biometric authentication function of the mobile banking application executed on the mobile computing device comprises a facial biometric authentication function.

15. The system of claim 1, wherein the biometric authentication function of the mobile banking application executed on the mobile computing device comprises a retinal biometric authentication function.

* * * * *